United States Patent
Yashiro

(10) Patent No.: US 11,597,387 B2
(45) Date of Patent: Mar. 7, 2023

(54) VEHICLE CONTROLLER, VEHICLE, AND VEHICLE CONTROL METHOD

(71) Applicant: HONDA MOTOR CO., LTD., Tokyo (JP)

(72) Inventor: Katsuya Yashiro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 279 days.

(21) Appl. No.: 16/822,302

(22) Filed: Mar. 18, 2020

(65) Prior Publication Data
US 2020/0307596 A1    Oct. 1, 2020

(30) Foreign Application Priority Data

Mar. 27, 2019   (JP) .............................. JP2019-061411

(51) Int. Cl.
*B60W 30/18* (2012.01)
*B60W 40/04* (2006.01)
*B60W 30/12* (2020.01)

(52) U.S. Cl.
CPC ...... *B60W 30/18163* (2013.01); *B60W 30/12* (2013.01); *B60W 40/04* (2013.01); *B60W 2420/52* (2013.01)

(58) Field of Classification Search
CPC .... B60W 30/00; B60W 30/12; B60W 30/143; B60W 30/18154; B60W 30/18163;
(Continued)

(56) References Cited

U.S. PATENT DOCUMENTS 11,209,819 B2 * 12/2021 Kuwahara ............ G05D 1/0061
11,225,257 B2 *  1/2022 Okuyama ......... B60W 60/0053
(Continued)

FOREIGN PATENT DOCUMENTS

CN    106796759 A  *  5/2017  ............ B60R 21/00
CN    107848537 A      3/2018
(Continued)

OTHER PUBLICATIONS

Office Action received in corresponding Japanese application No. 2019-061411 dated Jan. 26, 2021 with English translation (10 pages).
(Continued)

*Primary Examiner* — Angelina Shudy
(74) *Attorney, Agent, or Firm* — Rankin, Hill & Clark LLP

(57) ABSTRACT

A vehicle controller includes: a recognition unit that recognizes a surrounding state of a subject vehicle traveling in a road lane; an area specification unit that specifies a specific area in the lane in which the subject vehicle travels; and a driving control part that controls the subject vehicle with respect to a vehicle traveling ahead thereof, based on a result recognized b the recognition unit. The driving control part determines a condition of shifting from a first support status to a second support status such that there is a vehicle traveling ahead of the subject vehicle in the lane; and, if the subject vehicle enters the specific area at the first support status, the subject vehicle keeps the first support status, and if the subject vehicle enters the specific area at the second support status, shifts the support status from the second to the first support status.

17 Claims, 18 Drawing Sheets

(58) Field of Classification Search
CPC .. B60W 30/182; B60W 40/04; B60W 50/082; B60W 2050/009; B60W 2420/52; B60W 2554/406; B60W 2720/10; B60W 2720/106; G05D 1/0212; G05D 1/0061; G05D 1/0088; G05D 1/021; G05D 1/0214; G05D 1/0221; G05D 1/0223
See application file for complete search history.

(56) References Cited

U.S. PATENT DOCUMENTS

| | | | |
|---|---|---|---|
| 11,269,333 B2 * | 3/2022 | Kuwahara | G01C 21/20 |
| 11,498,563 B2 * | 11/2022 | Hirosawa | B60W 10/20 |
| 2005/0137775 A1 * | 6/2005 | Sekiguchi | B60W 30/165 |
| | | | 701/400 |
| 2005/0256630 A1 * | 11/2005 | Nishira | B60W 40/04 |
| | | | 701/41 |
| 2015/0302257 A1 * | 10/2015 | Takemura | B62D 15/028 |
| | | | 382/104 |
| 2016/0259334 A1 * | 9/2016 | Hashimoto | B60W 40/04 |
| 2016/0347327 A1 * | 12/2016 | Kondo | B60W 50/082 |
| 2017/0010612 A1 * | 1/2017 | Asakura | G01C 21/3415 |
| 2017/0010613 A1 * | 1/2017 | Fukumoto | G08G 1/096827 |
| 2017/0197634 A1 * | 7/2017 | Sato | G01C 21/26 |
| 2017/0197635 A1 * | 7/2017 | Sato | G01C 21/3658 |
| 2017/0203770 A1 | 7/2017 | Kondo | |
| 2017/0294120 A1 * | 10/2017 | Ootsuji | B62D 1/28 |
| 2018/0118223 A1 * | 5/2018 | Mori | B60W 40/04 |
| 2018/0120844 A1 * | 5/2018 | Okamoto | B60W 60/0057 |
| 2018/0201275 A1 | 7/2018 | Tsuji | |
| 2018/0211533 A1 * | 7/2018 | Nakajima | G05D 1/0278 |
| 2018/0217604 A1 * | 8/2018 | Nakajima | G01C 21/3492 |
| 2018/0237018 A1 * | 8/2018 | Goto | G05D 1/0088 |
| 2018/0237019 A1 * | 8/2018 | Goto | G01C 21/3658 |
| 2018/0292833 A1 * | 10/2018 | You | G05D 1/0212 |
| 2019/0106120 A1 | 4/2019 | Hatano et al. | |
| 2019/0113914 A1 | 4/2019 | Abe et al. | |
| 2019/0217868 A1 * | 7/2019 | Kim | B60W 50/0098 |
| 2019/0241198 A1 | 8/2019 | Mori et al. | |
| 2019/0295417 A1 * | 9/2019 | Hiramatsu | B60W 50/10 |
| 2020/0148205 A1 | 5/2020 | Yoshida et al. | |
| 2020/0307579 A1 * | 10/2020 | Mizoguchi | B62D 15/025 |
| 2020/0377102 A1 * | 12/2020 | Kuwahara | B60W 60/0011 |
| 2021/0316733 A1 * | 10/2021 | Mizoguchi | B60W 30/146 |
| 2022/0306116 A1 * | 9/2022 | Hashimoto | B60W 60/0053 |
| 2022/0315028 A1 * | 10/2022 | Kawano | B60W 50/14 |

FOREIGN PATENT DOCUMENTS

| | | | | |
|---|---|---|---|---|
| JP | 2009133801 A | * | 6/2009 | |
| JP | 2010-244196 A | | 10/2010 | |
| JP | 2016-028927 A | | 3/2016 | |
| JP | 2016-050901 A | | 4/2016 | |
| JP | 2018-072988 A | | 5/2018 | |
| JP | 2019-006280 A | | 1/2019 | |
| JP | 6796145 B2 | * | 12/2020 | ...... B60W 30/18163 |
| RU | 2754705 C1 | * | 9/2021 | ...... B60W 30/18154 |
| WO | WO-2016035485 A1 | * | 3/2016 | ............ B60W 10/18 |
| WO | 2017175377 A1 | | 10/2017 | |
| WO | 2017179151 A1 | | 10/2017 | |
| WO | 2018047249 A1 | | 3/2018 | |
| WO | 2019043847 A1 | | 3/2019 | |
| WO | WO-2019064350 A1 | * | 4/2019 | ...... B60W 30/18154 |
| WO | WO-2020213772 A1 | * | 10/2020 | ............ A61B 5/6893 |
| WO | WO-2021002081 A1 | * | 1/2021 | ............ B60W 10/20 |
| WO | WO-2021117132 A1 | * | 6/2021 | |

OTHER PUBLICATIONS

Office Action received in corresponding CN application No. 202010167153.0 dated Dec. 14, 2022, 7 pages.

* cited by examiner

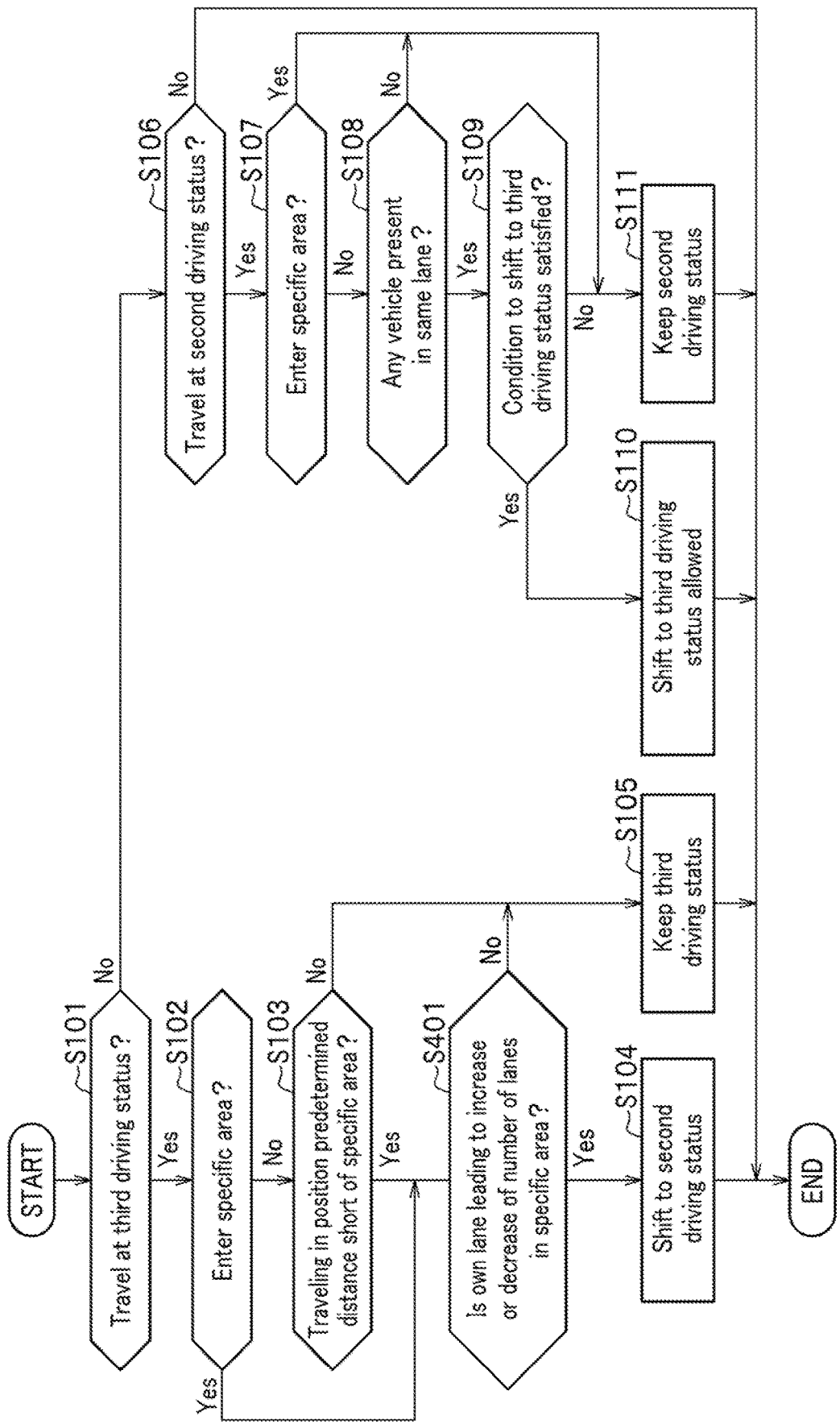

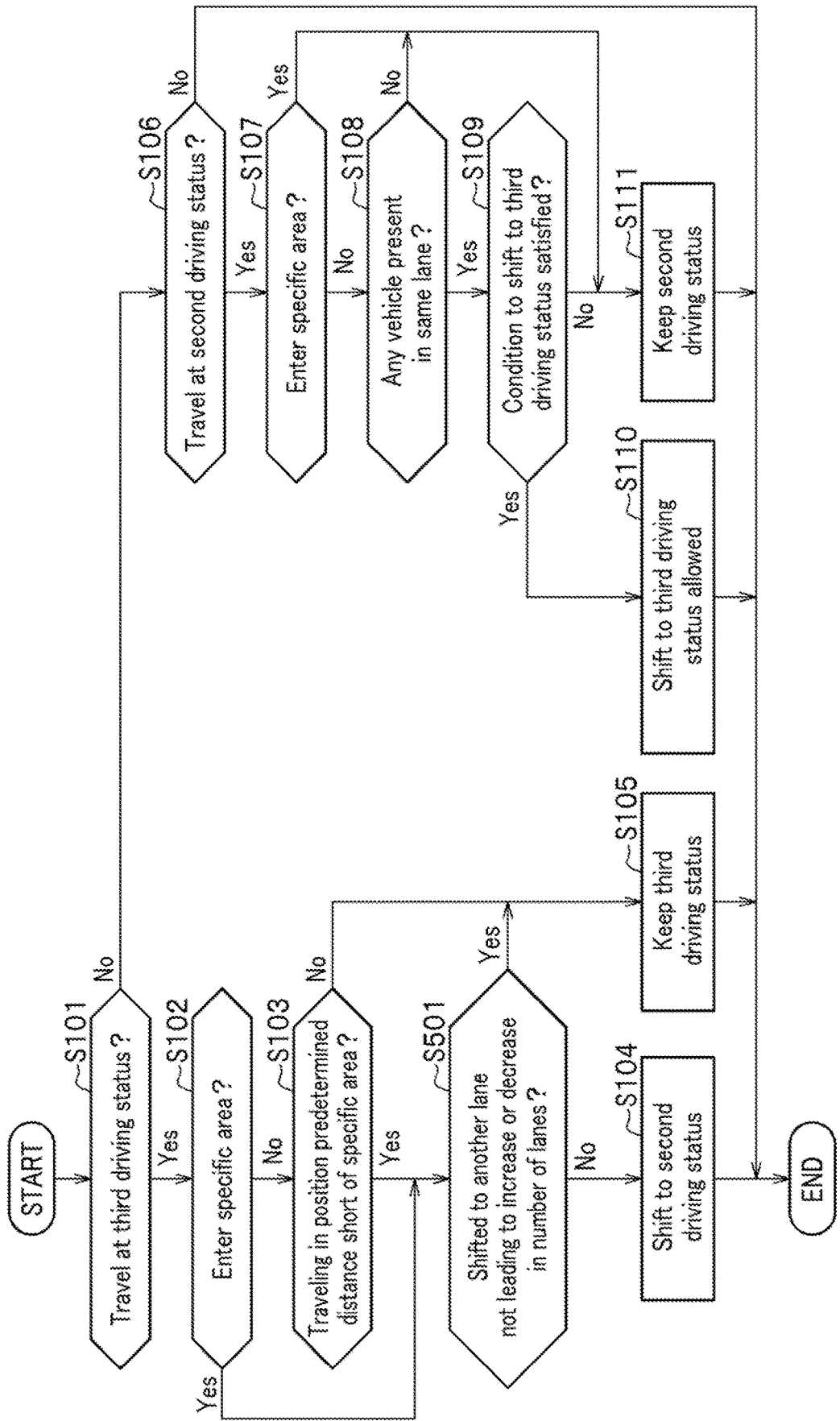

VEHICLE CONTROLLER, VEHICLE, AND VEHICLE CONTROL METHOD

CROSS REFERENCE TO RELATED APPLICATION

This application claims the benefit of Japanese Patent Application No. 2019-061411 filed on Mar. 27, 2019, the disclosure of which is incorporated herein by reference.

TECHNICAL FIELD

The present invention relates to a vehicle controller, a vehicle, and a vehicle control method.

BACKGROUND ART

WO 2018/047249 A1 (which may also be referred to as Patent Document 1) discloses a traveling plan revising device that includes: a traveling plan acquiring unit which acquires a first traveling plan from an automatic driving control device; a surrounding vehicle information acquiring unit which acquires surrounding vehicle information including at least a positional relationship between an own vehicle and surrounding vehicles; and a traveling plan revising unit which sets, as a traveling plan revision section, at least a partial section between a current location and an automatic driving level reduction switching location and constructs a second traveling plan with respect to the traveling plan revision section.

WO 2017/175377 A1 (which may also be referred to as Patent Document 2) discloses a vehicle control system that includes: an acquisition unit that acquires traffic conditions ahead in the direction a host vehicle is traveling; a prediction unit that refers to the traffic conditions acquired by the acquisition unit, and predicts a future state related to the host vehicle or the vicinity of the host vehicle; and a control unit that executes a vehicle control, and, after the vehicle control has been switched cancelled, prevents the switching or canceling of the vehicle control if the prediction unit predicts a return to the state before the switch or cancellation was executed within a prescribed period or within a prescribed travel distance.

RELATED ART DOCUMENTS

Patent Documents

[Patent Document 1] WO 2018/047249 A1
[Patent Document 2] WO 2017/175377 A1

SUMMARY OF THE INVENTION

Problem to be Solved by the Invention

In a scene where the number of lanes is increased or decreased, however, the automated driving device as described above in the conventional technology has such a problem that an appropriate level of automated driving is prevented and an unstable control state (something uncomfortable felt by a vehicle occupant) is brought about.

In light of the described above, the present invention has been made in an attempt to provide a vehicle controller, a vehicle, and a vehicle control method, each of which makes it possible for a vehicle to stably pass through a scene in which the number of lanes is increased or decreased.

Means for Solving the Problem

A vehicle controller includes: a recognition unit configured to recognize a surrounding state of a subject vehicle which travels in a lane on a road; an area specification unit configured to specify a specific area in the lane in which the subject vehicle travels; and a driving control part configured to provide control on the subject vehicle with respect to a vehicle traveling ahead thereof, based on a result recognized by the surrounding area recognition unit. The driving control part is configured to: make the subject vehicle operate at at least one of a first support status, and a second support status which has an automated degree higher than that of the first support status or has a task required to be done by a vehicle occupant less than that of the first support status; determine a condition of shifting from the first support status to the second support status such that there is at least a vehicle traveling ahead of the subject vehicle in the same lane in which the subject vehicle is traveling, the vehicle traveling ahead of the subject vehicle being recognized by the surrounding area recognition unit; and, when the subject vehicle enters the specific area, if the subject vehicle enters the specific area at the first support status, allow the subject vehicle to keep a support status thereof at the first support status, and, if the subject vehicle enters the specific area at the second support status, shift the support status from the second support status to the first support status.

Advantageous Effects of the Invention

The present invention can provide a vehicle controller, a vehicle, and a vehicle control method, each of which makes it possible for a vehicle to stably pass through a scene in which the number of lanes is increased or decreased.

BRIEF DESCRIPTION OF THE DRAWINGS

FIG. 18 is a flowchart illustrating an example a still another vehicle control processing ("determination depending on lane") in the vehicle controller according to the embodiment.

FIG. 19 is a flowchart illustrating an example of a yet another vehicle control processing ("shift from lane leading to specific area to another") in the vehicle controller according to the embodiment.

EMBODIMENTS FOR CARRYING OUT THE INVENTION

An embodiment of the present invention is described in detail below with reference to related drawings. Explanation below is made assuming a country or a region where a rule of left-hand traffic is applied to. In other country or region where a rule of right-hand traffic is applied to, the explanation is available with right and left exchanged with each other.

Embodiment

Figure 1:
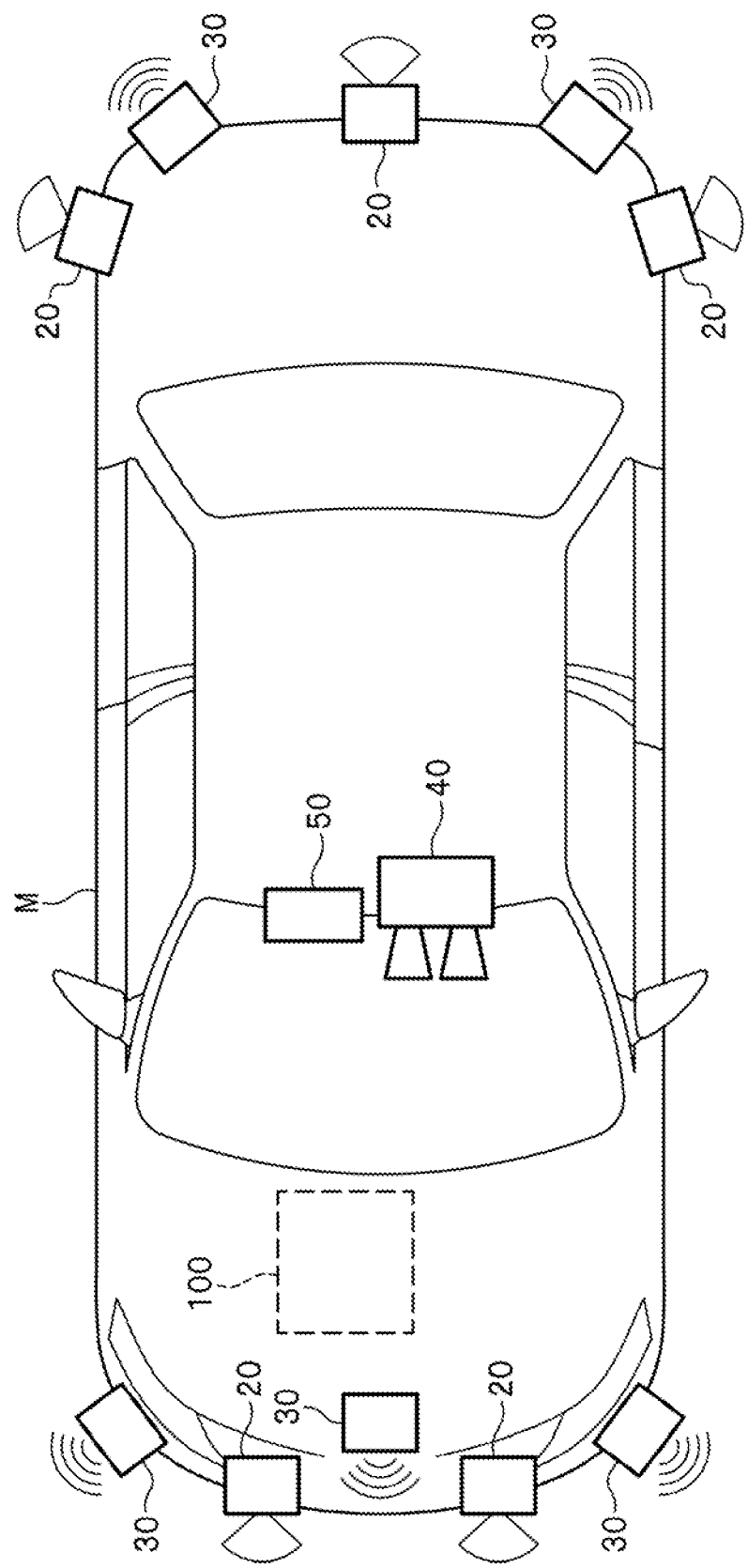
FIG. 1 is a diagram illustrating an entire structure of a vehicle in which a vehicle controller according to an embodiment of the present invention is included.

FIG. 1 is a diagram illustrating an entire structure of a vehicle in which a vehicle controller 100 according to an embodiment of the present invention is included. The vehicle of interest in which the vehicle controller 100 is mounted (which may also be referred to as a subject vehicle M hereinafter) is, for example, a two-wheeled vehicle, a three-wheeled vehicle, a four-wheeled vehicle, or the like, and may be: a vehicle which has an internal combustion engine such as a diesel engine and a gasoline engine as a power source; an electric vehicle which has an electric motor as the power source; a hybrid vehicle including both the internal combustion engine and the electric motor; or the like.

The above-described electric vehicle is driven by using electric power which is discharged from a battery such as, for example, a secondary battery, a hydrogen fuel cell, a metallic fuel cell, and an alcohol fuel cell.

Subject Vehicle M

As illustrated in FIG. 1, the subject vehicle M includes: sensors including a finder 20, a radar 30, and a camera 40; a navigation device 50; and the vehicle controller 100.

The finder 20 is, for example, a LIDAR (Light Detection and Ranging or Laser Imaging Detection and Ranging) which measures a distance to a target by illuminating the target with light and then measures the reflected scattered light. For example, two units of the finders 20 are disposed right and left spaced apart from each other in a front part of the subject vehicle M, and three units of the finders 20 are disposed in a rear side thereof (totaling five units in the front and the rear parts).

For example, three units of the radars 30 are disposed right in the front part of the subject vehicle M, and two units of the radars 30 are disposed in the rear side thereof (totaling five units in the front and the rear parts). The radar 30 detects an object by, for example, a FM-CW (Frequency Modulated Continuous Wave) method.

The camera 40 is, for example, a digital camera which uses a solid-state image sensing device such as a CCD (Charge Coupled Device) and a CMOS (Complementary Metal Oxide Semiconductor). The camera 40 is attached to an upper side of a front windshield, a rear surface of a rearview mirror, or the like. The camera 40 captures, for example, an image of an area in front of the subject vehicle M itself periodically and repetitively. In the example of FIG. 1, two monocular cameras are illustrate as the cameras 40. The camera 40 may be, however, a stereo camera.

The configuration illustrated in FIG. 1 is given for illustrative purpose only, and part of the configuration may be omitted, or another configuration may be added thereto.

Vehicle Controller 100

Figure 2:
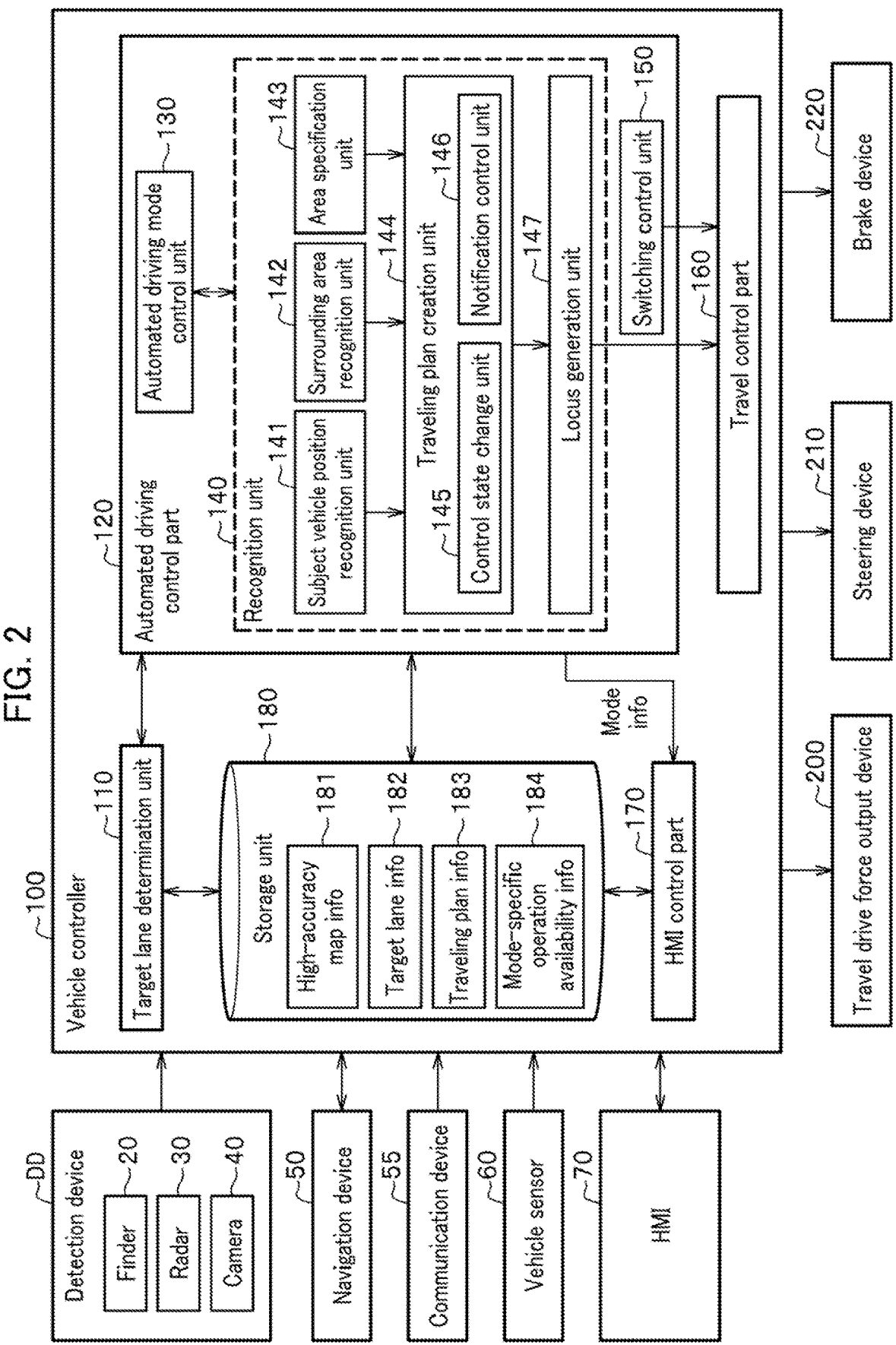
FIG. 2 is a functional configuration diagram focusing on the vehicle controller according to the embodiment.

FIG. 2 is a functional configuration diagram focusing on the vehicle controller 100 according to this embodiment. The subject vehicle M includes: a detection device DD including the finder 20, the radar 30, and the camera 40; the navigation device 50; a communication device 55; a vehicle sensor 60; a human machine interface (HMI) 70; the vehicle controller 100; a travel drive force output device 200; a steering device 210; and a brake device 220; Those devices and apparatuses are connected to each other through a multiplex communication line such as a CAN (Controller Area Network) communication line, a serial communication line, a radio communication network, or the like. Note that, a vehicle controller may be referred to as not only the "vehicle controller 100" alone but also, in addition to the vehicle controller 100, other components (such as the detection device DD, a HMI 70, or the like).

Navigation Device 50

The navigation device 50 includes a GNSS (Global Navigation Satellite System) receiver, map information (a navigation map), a touch panel type display device which functions as a user interface, a speaker, a microphone, or the like. The navigation device 50 specifies a position of the subject vehicle M by the GNSS receiver and gives a route from the position to a destination designated by a user. A target lane determination part 110 (to be described hereinafter) of the vehicle controller 100 is provided with the route given by the navigation device 50. The position of the subject vehicle M may be specified or supplemented by an INS (Inertial Navigation System) which uses an output of the vehicle sensor 60. Also, when the vehicle controller 100 performs a manual driving mode, the navigation device 50 gives guidance on the route to the destination by voice, sound, or navigation display.

Note that a configuration for specifying a position of the subject vehicle M may be provided separately from the navigation device 50. The navigation device 50 may be realized, for example, by a function of a terminal device such as a smart phone and a tablet terminal carried by a user. In this case, information is transmitted and received between the terminal device and the vehicle controller 100 by radio communication or wired communication.

Communication Device 55

The communication device 55 performs radio communication using, for example, a cellular network, a Wi-Fi network, Bluetooth (registered trademark), DSRC (Dedicated Short Range Communication), or the like. The communication device 55 performs, for example, radio communication with an information providing server of a system which monitors a traffic situation of a road, such as VICS (Vehicle Information and Communication System) (registered trademark)) and acquires information (hereinafter, referred to as "traffic information") indicating a traffic situation of a road on which the subject vehicle M is traveling or is going to travel. The traffic information includes such information as information on traffic jam ahead, a time required for passing through a traffic jam area, information on accident, a disabled car, and a construction work, information on speed control and lane control, information on location of parking lot and on whether a parking lot, a highway travel center, or a rest stop is full or not. The communication device 55 may acquire the traffic information by performing communication with a radio beacon provided in a side strip of a road or by performing vehicle-to-vehicle communication with another vehicle which is traveling near the subject vehicle M. The communication device 55 is an example of an "acquisition unit" which acquires information on traffic jam.

Vehicle Sensor 60

The vehicle sensor 60 includes a vehicle speed sensor that determines a vehicle speed of the subject vehicle M, an acceleration sensor that detects acceleration thereof, a yaw rate sensor that determines an angular velocity about a vertical axis thereof, and an orientation sensor that determines in which direction the subject vehicle M is traveling.

HMI 70

Figure 3:
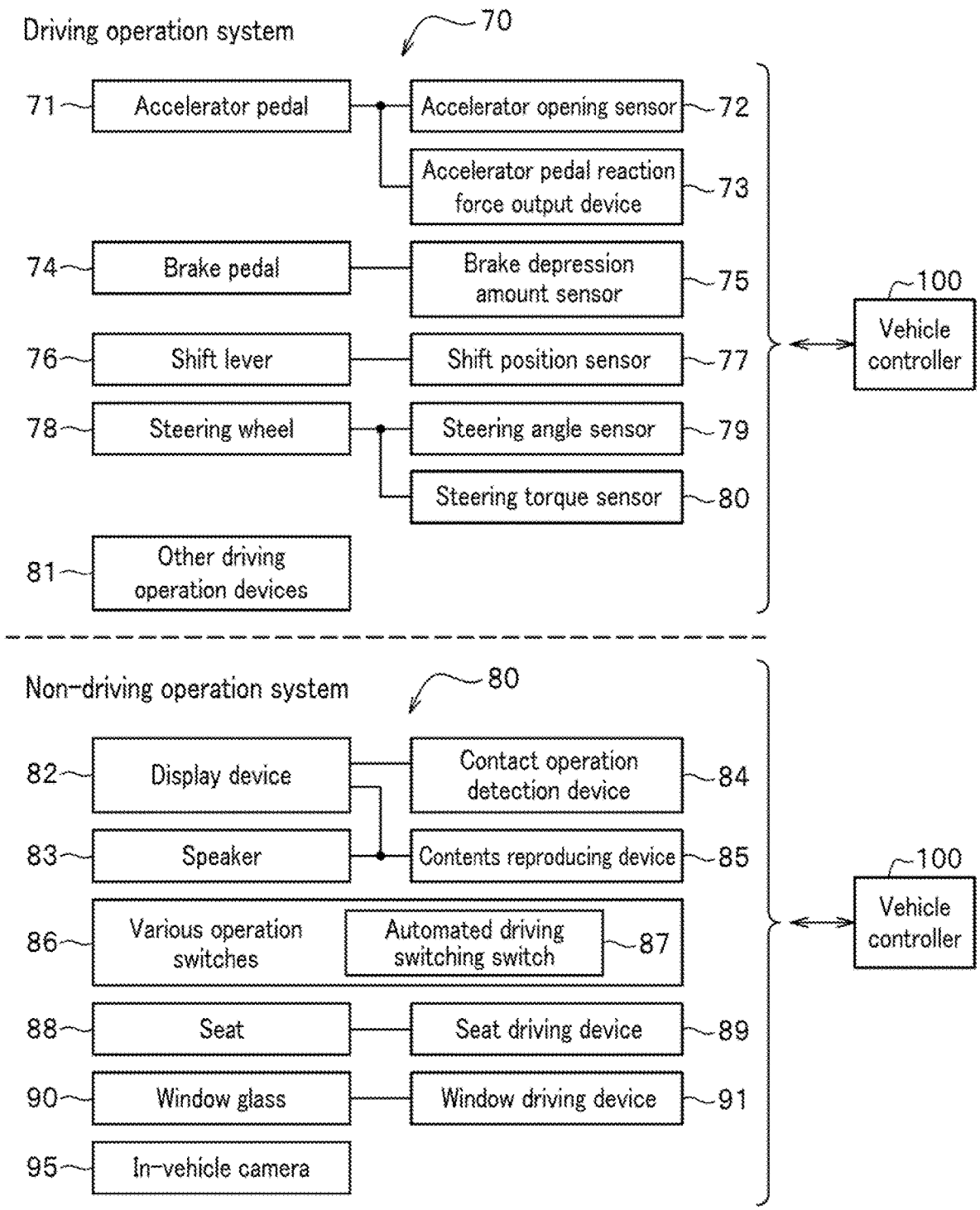
FIG. 3 is a configuration diagram illustrating a HMI of the vehicle controller according to the embodiment.

FIG. 3 is a configuration diagram illustrating the HMI 70.
As illustrated in FIG. 3, the HMI 70 includes: a configuration of a driving operation system; and a configuration of a non-driving operation system. A boundary therebetween is not specifically defined, and the configuration of the driving operation system may include a function of the non-driving operation system (or vice versa). The navigation device 50 and the HMI 70 are each an example of an "output unit".

The HMI 70 includes, as components of the driving operation system, an accelerator pedal 71, an accelerator opening sensor 72, an accelerator pedal reaction force output device 73, a brake pedal 74, a brake depression amount sensor (or a master pressure sensor or the like) 75, a shift lever 76, a shift position sensor 77, a steering wheel 78, a steering angle sensor 79, a steering torque sensor 80, and other driving operation devices 81.

The accelerator pedal 71 is an operator which allows input of an acceleration instruction (or a deceleration instruction by a return operation) by a vehicle occupant. The accelerator opening sensor 72 detects a depression amount of the accelerator pedal 71 and outputs an accelerator opening signal indicating the depression amount to the vehicle controller 100.

The accelerator pedal 71 may directly output an accelerator opening signal to, instead of the vehicle controller 100, the travel drive force output device 200, the steering device 210, or the brake device 220. The same is applied to configurations of other driving operation systems to be described hereinafter. The accelerator pedal reaction force output device 73 outputs, for example, a force (an operation reaction force) in a direction opposite to an operation direction with respect to the accelerator pedal 71 in response to an instruction from the vehicle controller 100.

The brake pedal 74 is an operator which allows input of an instruction of deceleration by a vehicle occupant. The brake depression amount sensor 75 detects a depression amount (or a depression force) of the brake pedal 74 and outputs a brake signal indicating the detected result to the vehicle controller 100.

The shift lever 76 is an operator that allows input of an instruction of changing a shift stage by the vehicle occupant. The shift position sensor 77 detects a shift stage instructed by the vehicle occupant and outputs a shift position signal indicating the detected result to the vehicle controller 100.

The steering wheel 78 is an operator that allows input of an instruction of turning, by the vehicle occupant. The steering angle sensor 79 detects an operation angle of the steering wheel 78 and outputs a steering angle signal indicating the detected result to the vehicle controller 100. The steering torque sensor 80 detects the torque applied to the steering wheel 78 and outputs a steering torque signal indicating the detected result to the vehicle controller 100.

Examples of the other driving operation devices 81 include a joystick, a button, a dial switch, and a GUI (Graphical User Interface) switch. The other driving operation devices 81 allow input of an instruction of acceleration, of deceleration, of turning, or the like and output the instruction to the vehicle controller 100.

The HMI 70 includes, as the configuration of the non-driving operation system, for example, a display device 82, a speaker 83, a contact operation detection device 84, a content reproducing device 85, various operation switches 86, a seat 88, a seat driving device 89, a window glass 90, and a window driving device 91.

Examples of the display device 82 include, for example, a LCD (Liquid Crystal Display), an organic EL (Electroluminescence) display, or the like, each of which is attached to various portions of an instrument panel or any portion which faces a front passenger seat or a rear seat, or the like. The display device 82 may be a HUD (Head-Up Display) which projects an image onto a front windshield or other window. The speaker 83 outputs voice. In a case where the display device 82 is a touch panel, the contact operation detection device 84 detects a contacted location (a touched location) on a display screen of the display device 82 and outputs the contacted location to the vehicle controller 100. In a case where the display device 82 is not a touch panel, however, the contact operation detection device 84 may be omitted.

The content reproducing device 85 includes, for example, a DVD (Digital Versatile Disc) reproducing device, a CD (Compact Disc) reproducing device, a television receiver, a device generating various guidance images, or the like. A part or all of the display device 82, the speaker 83, the contact operation detection device 84, and the content reproducing device 85 may each have a configuration common to that of the navigation device 50.

The various operation switches 86 are disposed at any positions in the subject vehicle M. The various operation switches 86 include an automated driving switching switch 87 which gives an instruction of a start (or a start after an elapse of a prescribed time) and an end of automated driving. The automated driving switching switch 87 may be a GUI (Graphical User Interface) switch or a mechanical switch. The various operation switches 86 may include a switch which drives the seat driving device 89 or the window driving device 91.

The seat 88 is a seat on which a vehicle occupant sits. The seat driving device 89 freely drives a reclining angle, a position in a front and rear direction, a yaw angle, or the like of the seat 88. The window glass 90 is disposed in, for example, respective doors. The window driving device 91 drives an opening and a closing operations of the window glass 90.

The in-vehicle camera 95 is a digital camera making use of the CCD, the CMOS, or the like. The in-vehicle camera 95 is attached to a position at which an image of at least a head of a vehicle occupant who performs a driving operation can be captured. Some examples of the position include a rearview mirror, a steering boss portion, and an instrument panel. The camera 40 captures an image of the vehicle occupant periodically and repetitively, for example.

Referring back to FIG. 2, the vehicle controller 100 is realized by, for example, one or more processors or hardware having a function equivalent thereto. The vehicle controller 100 may have a configuration in which: an ECU (Electronic Control Unit) in which a processor such as a CPU (Central Processing Unit), a storage device, and a communication interface are connected to each other by an internal bus; or a MPU (Micro-Processing Unit), or the like are combined with each other.

The vehicle controller 100 includes the target lane determination part 110, an automated driving control part 120 (which may also be referred to as an driving control unit), an automated driving mode control unit 130, a recognition unit 140, a switching control unit 150, a travel control part 160, a HMI control part 170, and a storage part 180. For example, the automated driving control part 120 includes a surrounding area recognition unit 142, a traveling plan creation unit 144, a locus generation unit 147, and a future state prediction unit 152. A combination of the automated driving mode control unit 130, the traveling plan creation unit 144, the locus generation unit 147, and the switching control unit 150 is an example of a "control unit".

A part or all of the target lane determination part 110, the respective units of the automated driving control part 120, and the travel control part 160 are realized when a processor executes a program (software). Part or all of those components may be realized by hardware such as a LSI (Large Scale Integration) and an ASIC (Application Specific Integrated Circuit) or may be realized by a combination of software and hardware.

In explanation below, it is assumed that the automated driving control part 120 executes functions of the respective units (to be described in detail hereinafter) by reading an appropriate program as needed from a ROM-EEPROM (Electrically Erasable Programmable Read-Only Memory) and loading the read program in a RAM. The program may be previously stored in the storage part 180 or may be loaded via other storage medium or communication medium as needed.

Target Lane Determination Part 110

The target lane determination part 110 is realized by, for example, a MPU (Micro Processing Unit). The target lane determination part 110 divides a route provided form the navigation device 50 into a plurality of blocks (for example, divides the route for every 100 meters in a vehicle traveling direction) and determines a target lane for each of the blocks by referencing high-accuracy map information 181. For example, in a case where there is a road fork, a junction, or the like on the route, the target lane determination part 110 determines an appropriate target lane such that the subject vehicle M can travel on a reasonable travel route to travel through such a road fork to a destination. The target lane determined by the target lane determination part 110 is stored in the storage part 180 as target lane information 182.

Automated Driving Control Part 120

The automated driving control part 120 includes the automated driving mode control unit 130, the recognition unit 140, and the switching control unit 150.

Automated Driving Mode Control Unit 130

The automated driving mode control unit 130 determines a mode of automated driving to be performed by the automated driving control part 120. The mode of the automated driving in this embodiment includes modes to be described below. Note that the following description is illustrative only, and any number of modes of automated driving may be determined. A name of a level in the mode of automated driving is also presented as an example.

Control of automated driving of the subject vehicle M is performed under, for example, modes as follows: a first driving status (which may also be referred to as a "first support status"); a second driving status (which may also be referred to as the "first support status"); and a third driving status (which may also be referred to as a "second support status").

A burden which a driver bears at the third driving status is lower than that at the second driving status. In other words, an automated degree at the third driving status is higher than that at the second driving status. A burden which a driver bears at the second driving status is lower than that at the first driving status. In other words, an automated degree at the second driving status is higher than that at the first driving status.

For example, a driver needs to hold a steering handle at the first driving status. Meanwhile, the driver does not need to hold the steering handle at the second driving status.

[Third driving status] The third driving status is a system-driven driving and it is necessary for a driver to monitor the system. When a driving at the third driving status is performed, automated driving is automatically conducted only in a limited scene (monitoring the system is still required).

An example of a travel state selected in the third driving status is a traffic jam following mode (a low-speed following mode; traffic jam pilot (TJP)), when a traffic jam occurs. In the traffic jam following mode, a safe automated driving can be realized by following a preceding vehicle on a congested expressway. The traffic jam following mode is released when, for example, a travel speed of the subject vehicle M becomes equal to or higher than a predetermined speed (for example, 60 km/h or over). There is another case in which the third driving status is switched to another travel state at a timing of terminating the traffic jam following mode. Switching to other selectable travel mode may also be performed, however, at the third driving status (see "outline of shift of control statuses" illustrated in FIG. 10 to be described hereinafter).

Note that at the third driving status, a driver monitoring camera (not illustrated) is used and the system determines whether or not a driver is taking a look back or the like, or whether or not the driver is ready for a shift of driving status (whether or not the driver is asleep or in a faint).

[Second driving status] The second driving status is a mode of which automated degree is high next to the third driving status. When the subject vehicle M travels at the second driving status, overall control thereon is in principal performed automatically. Depending on a situation, however, a vehicle occupant is required to drive the subject vehicle M.

An example of the control described above is that, because it is assumed that automated driving at the second driving status is performed only in a through lane, driving assistance while traveling at the second driving status is provided only when the subject vehicle M is traveling on a through lane. Thus, automated driving in the second driving status is not provided when the subject vehicle M is traveling at a road fork, a junction, or a tollgate on a through lane, or is traveling on a through lane of a two-lane road.

The second driving status thus requires an increased duty of monitoring surroundings, compared to the third driving status.

[First driving status] The first driving status is a mode of which automated degree is high next to the second driving status. When the first driving status is performed, it is necessary for the vehicle occupant to hold a steering handle any time, which is not a confirmation operation depending a situation. The vehicle occupant is required for a constant monitoring of surroundings and a state of the subject vehicle M.

In the first driving status or the second driving status, an automatic lane change is conducted when, for example, a vehicle occupant is notified of a timing lane change and then performs an operation of instructing the HMI 70 to change lanes.

Automated Driving Mode Control Unit 130

The automated driving mode control unit 130 determines the mode of automated driving based on an operation by the vehicle occupant via the HMI 70, an event determined by the traveling plan creation unit 144, a travel aspect determined by the locus generation unit 147, or the like. The HMI control part 170 is notified of the mode of the automated driving. A limit depending on performance of the determination device DD of the subject vehicle M or the like may be set to the mode of the automated driving. For example, when the performance of the determination device DD is low, automated driving at the third driving status may not be set to be performed.

In any of the automated driving modes, switching to a manual driving mode (an overriding) is possible by operating one or more components of the driving operation system in the HMI 70. The overriding is started, for example: when a vehicle occupant of the subject vehicle M operates the driving operation system of the HMI 70 for a predetermined period of time or longer; when a variation in an amount associated with an operation becomes equal to or larger than a predetermined value (for example, an accelerator opening of the accelerator pedal 71, a brake depression amount of the brake pedal 74, a steering angle of the steering wheel 78); or when the operation of the driving operation system is performed a predetermined number of times or more.

Recognition Unit 140

The recognition unit 140 includes a subject vehicle position recognition unit 141, a surrounding area recognition unit 142 (which may also be referred to as a recognition unit), an area specification unit 143 (a detection unit), a traveling plan creation unit 144, and a locus generation unit 147.

Subject Vehicle Position Recognition Unit 141

The subject vehicle position recognition unit 141 recognizes a lane (a travel lane) in which the subject vehicle M is traveling, and a relative position of the subject vehicle M with respect to the travel lane, based on the high-accuracy map information 181 stored in the storage part 180 and on information inputted from the camera 10, the finder 20, the radar 30, the navigation device 50, or the vehicle sensor 60.

The subject vehicle position recognition unit 141 recognizes a travel lane by comparing a pattern of a road partition line (for example, arrangement of a solid line and a broken line) recognized from the high-accuracy map information 181, and a pattern of a load partition line near the subject vehicle M by an image captured from the camera 40. In the recognition, a position of the subject vehicle M acquired from the navigation device 50, or a processing result by the INS may be taken into account.

Figure 4:
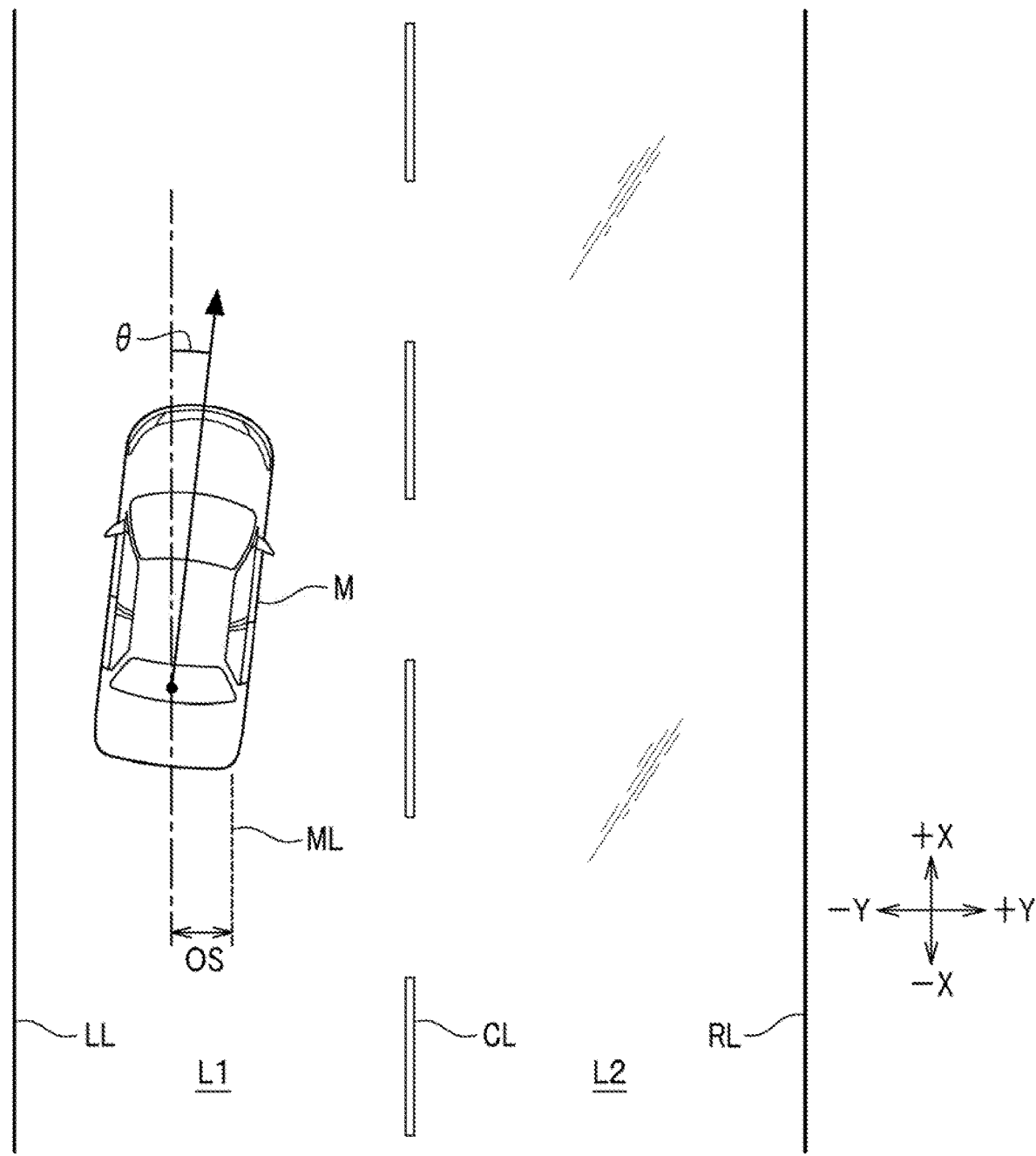
FIG. 4 is a diagram illustrating a state in which the subject vehicle position recognition unit of the vehicle controller recognizes a relative position of the subject vehicle with respect to a travel lane, according to the embodiment.

FIG. 4 is a diagram illustrating a state in which the subject vehicle position recognition unit 141 recognizes a relative position of the subject vehicle M with respect to a travel lane. In FIG. 4: a first lane L1 is a travel lane defined by a lane marking LL and a lane marking CL; a second lane L2 is a travel lane defined by the lane marking CL and a lane marking RL, both of which are the lanes in which a vehicle travels in a direction+X. The lanes L1 and L2 are adjacent to each other for vehicles travelling in the same direction. There is a road shoulder on the left of the first lane L1.

As illustrated in FIG. 4, the subject vehicle position recognition unit 141 recognizes, for example: a deviation OS of a reference point (for example, a center of gravity) of the subject vehicle M from a centerline of a travel lane ML in which the subject vehicle M is traveling; and an angle θ made by a traveling direction of the subject vehicle M and the centerline of the travel lane ML, each as a relative position of the subject vehicle M with respect to the travel lane L1. Alternatively, the subject vehicle position recognition unit 141 may recognize a position of the reference point of the subject vehicle M with respect to any of side edges of the travel lane L1 in which the subject vehicle M is traveling, as a relative position of the subject vehicle M with respect to the travel lane L1. The target lane determination part 110 is provided with the relative position of the subject vehicle M recognized by the subject vehicle position recognition unit 141.

Surrounding Area Recognition Unit 142

Referring back to FIG. 2, the surrounding area recognition unit 142 recognizes a state such as a position, a speed, and an acceleration of a surrounding vehicle based on information inputted from the finder 20, the radar 30, the camera 40, or the like. The surrounding vehicle herein means a vehicle which is traveling in a vicinity of the subject vehicle M in a direction same as that of the subject vehicle M. The position of the surrounding vehicle may be indicated as a representative point such as the center of gravity and a corner of another vehicle or may be indicated by a zone represented by a contour of other vehicle. The term "state" of the surrounding vehicle may include acceleration of the surrounding vehicle, and whether or not the surrounding vehicle is changing a lane (or whether or not the surrounding vehicle intends to change lanes), which can be obtained based on information acquired from the above-described various components. The surrounding area recognition unit 142 may recognize, in addition to the surrounding vehicle, positions of a guard rail, an electric pole, a parked vehicle, a pedestrian, or any other objects.

Area Specification Unit 143

The area specification unit 143 specifies a specific area in a lane on a road, in which the subject vehicle is traveling. The specific area herein means an area with an interchange, a junction, the number of lanes increased or decreased, or the like. The area specification unit 143 acquires a specific area from map information. This makes it possible to detect a specific area located at a long distance from the subject vehicle M, even when a vehicle traveling in front of the subject vehicle M prevents the specific area from being detected therefrom.

For purpose of illustration, the area specification unit 143 is described separately and independently from the camera 10 and the surrounding area recognition unit 142. The area specification unit 143 may be, however, any component that can detect a specific target object such as an image processing unit that extracts a human or the like from an image taken by the camera 10, and a unit that recognizes and detects a human or the like from a contour of an image in an internal processing performed by the surrounding area recognition unit 142. In this case, the area specification unit 143 is omitted from the recognition unit 140.

As to be described hereinafter, a probability of specifying a specific area detected by the area specification unit 143 can be improved by using VICS information obtained by the communication device 55.

Traveling Plan Creation Unit 144

The traveling plan creation unit 144 sets a start point of an automated driving, and/or a destination thereof. The start point of the automated driving may be a current position of the subject vehicle M or may be a point at which an operation of instructing to start the automated driving is conducted. The traveling plan creation unit 144 creates a traveling plan in a section between the start point and the destination of the automated driving, but not limited to this. The traveling plan creation unit 144 may create a traveling plan in any section.

The traveling plan includes, for example, a plurality of events which are sequentially executed. Some examples of the events include: a deceleration event of decelerating the subject vehicle M; an acceleration event of accelerating the subject vehicle M; a lane keeping event of making the subject vehicle M travel without deviating from a travel lane; a lane change event of making the subject vehicle M change a travel lane thereof; an overtake event of making the subject vehicle M overtake a vehicle ahead thereof; a road fork event of making the subject vehicle M change a travel lane thereof to a desired lane at a fork point or making the subject vehicle M keep a present travel lane without changing; a junction event of making the subject vehicle M accelerate or decelerate at a junction at which vehicles are merged to a through lane and change a travel lane thereof; a hand-over event of making the subject vehicle M shift from a manual driving mode to an automated driving mode at a start point of an Automated driving or shift from the automated driving modef to the manual driving mode at a target end point of the automated driving; or the like.

The traveling plan creation unit 144 sets the lane change event, the fork event, or the junction event at a point at which a target lane determined by the target lane determination part 110 is switched. Information indicating a traveling plan created by the traveling plan creation unit 144 is stored in the storage part 180 as traveling plan information 183.

The traveling plan creation unit 144 includes a control state change unit 145 and a notification control unit 146.

Control State Change Unit 145

The control state change unit 145 makes the subject vehicle M operate at least at one of the following two statuses: at the first driving status and at the third driving status; and at the second driving status and at the third driving status. Each of the first driving status and the second driving status herein refers to a driving state in which at least a task of monitoring surroundings is imposed on a driver. The third driving status herein refers to a driving state in which a task imposed on the driver is reduced, compared to that at the second driving status (that is, an automated degree at the third driving status is higher than that at the second driving status). The first driving status is, for example, a low-level automated driving and requires that a driver carries out a task of taking the steering wheel 78 (see FIG. 3) where necessary. The second driving status is an automated driving at a level higher than the first driving status and does not require that a driver carries out a task of taking the steering wheel 78.

Note that, if the first driving status is a state in which a driver manually drives a vehicle or in which ADAS (Advanced Driver Assistance System) is working, the second driving status may be a state in which an automated driving is performed. The ADAS is a driving support system of which representative examples include the ACC (Adaptive Cruise Control System) and the LKAS (Lane Keeping Assist System).

In this embodiment, the control state change unit 145 provides control on a vehicle as described below. Actually, however, the control state change unit 145 is a function part of the automated driving control part 120, and thus, an operation of the control state change unit 145 can be taken as an operation of the automated driving control part 120.

The control state change unit 145 makes the subject vehicle M travel at least at the first driving status or at the second driving status of which automated degree is higher than that of the first driving status or of which task required to be done by a vehicle occupant is less. The control state change unit 145 has such a condition of shifting from the first driving status to the second driving status that there is at least a vehicle traveling ahead of the subject vehicle M in a same lane recognized by the surrounding area recognition unit 142. When the subject vehicle M enters a specific area (an interchange, a junction, the number of lanes increased or decreased, or the like): and, if the subject vehicle M travels at the second driving status, the control state change unit 145 allows the subject vehicle M to keep the second driving status; and, if the subject vehicle M travels at the third driving status, the control state change unit 145 shifts the driving status to the second driving status.

After the subject vehicle M has passed through an area having one or more through lanes, of which number is increased or decreased therein, the control state change unit 145 re-shifts the driving status of the subject vehicle M from the second driving status to the third driving status, only if there is no specific area within a predetermined distance from a current position of the subject vehicle M.

When passing through a specific area: and, if the number of lanes leading to a lane in which the subject vehicle M is traveling is increased or decreased, the control state change unit 145 shifts the driving status from the third driving status to the second driving status; and, if the number of lanes leading to a lane in which the subject vehicle M is not traveling is increased or decreased, the control state change unit 145 keeps the driving status at the third driving status.

If the number of lanes leading to a lane in which the subject vehicle M is traveling is increased or decreased in the specific area, as described above, the control state change unit 145 shifts the driving status from the third driving status to the second driving status, and then, if the subject vehicle M changes lanes to a second lane, which is different from the lane in which the subject vehicle has traveled, the control state change unit 145 re-shifts the driving status from the third driving status to the second driving status.

The specific area used herein includes: a first lane leading to an area in which the number of lanes is increased or decreased; and a second lane adjacent to the first lane. The control state change unit 145 determines a shift position which is situated at a predetermined distance short of the specific area, and at which the driving status is shifted from the third driving status to the second driving status. The control state change unit 145 sets the predetermined distance while traveling in the first lane larger than that in the second lane.

The control state change unit 145 sets a re-shift start distance in the second lane larger than that in the first lane. The re-shift start distance is a distance at which a re-shift to the third driving status is allowed, when passing through a specific area.

Details will be described hereinafter, regarding a processing of shifting the driving status of the subject vehicle M from the third driving status to the second driving status and a prescribed condition of returning the driving status from the second driving status to the third driving status.

Notification Control Unit 146

When the control state change unit 145 shifts the driving status of the subject vehicle M to the first driving status, the notification control unit 146 notifies a driver of the subject vehicle M of the shift to the first driving status. When the control state change unit 145 shifts the driving status to "manual driving" in which he automated driving is stopped, the notification control unit 146 notifies a driver of the subject vehicle M of the shift to the automated driving. The notification control unit 146 makes a speaker 70 output speech information previously stored in the storage part 180. The speech information includes, for example: when the driving status is shifted from the second driving status to the first driving status, "the driving status is shifted to the first driving status because a traffic jam is cleared"; and, when the driving status is shifted from the first driving status to a manual driving, "The driving status is switched to a manual driving because an obstacle has been detected".

The speeches described above are given just as examples and are not limited to those. Any other sound or speech may be used as long as notification of a shift of automated driving to a driver of the subject vehicle M is possible. Instead of the speech, notification may be carried out by light generation, displaying, or the like.

Figure 5:
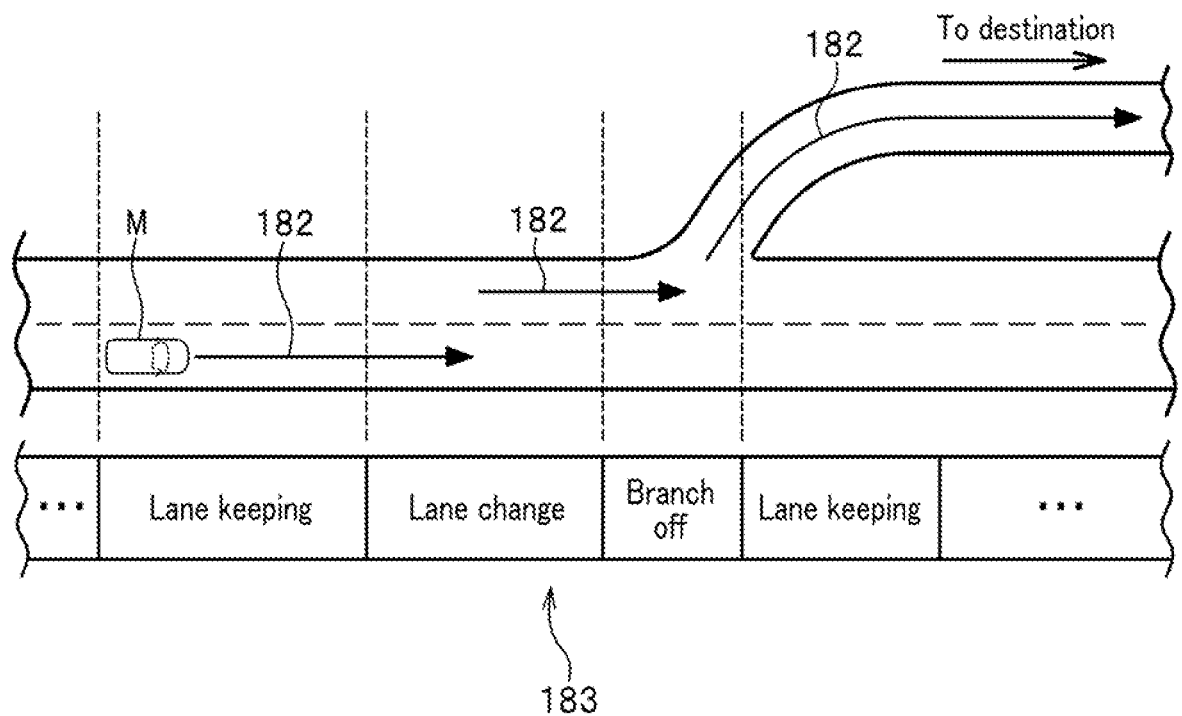
FIG. 5 is a diagram illustrating an example of a traveling plan created for a section in the vehicle controller according to the embodiment.

FIG. 5 is a diagram illustrating an example of a traveling plan created for a section.

As illustrated in FIG. 5, the traveling plan creation unit 144 creates a traveling plan necessary for the subject vehicle M to travel in a target lane indicated by the target lane information 182. The traveling plan creation unit 144 may dynamically change the traveling plan depending on a situation of the subject vehicle M, irrespective of the target lane information 182. When, for example, a speed of a vehicle traveling near the subject vehicle M recognized by the surrounding area recognition unit 142 exceeds a threshold value or when a traveling direction of a vehicle traveling in a nearby lane turns to a direction of a lane in which the subject vehicle M is traveling, the traveling plan creation unit 144 changes an event set in a driving section on which the subject vehicle M is scheduled to travel.

For example, when an event is set such that a lane change event is performed after a lane keeping event, if it is determined that the surrounding area recognition unit 142 has recognized that a vehicle is traveling at a speed equal to or higher than a threshold value from behind in a lane in which the subject vehicle M is set to travel during the lane keeping event, the traveling plan creation unit 144 may change an event next to the lane keeping event, not to the lane change event, but to a deceleration event, a lane keeping event, or the like. As a result, the vehicle controller 100 can make the subject vehicle M to suitably perform automated driving, even when a surrounding situation changes.

Locus Generation 147

Figure 6:
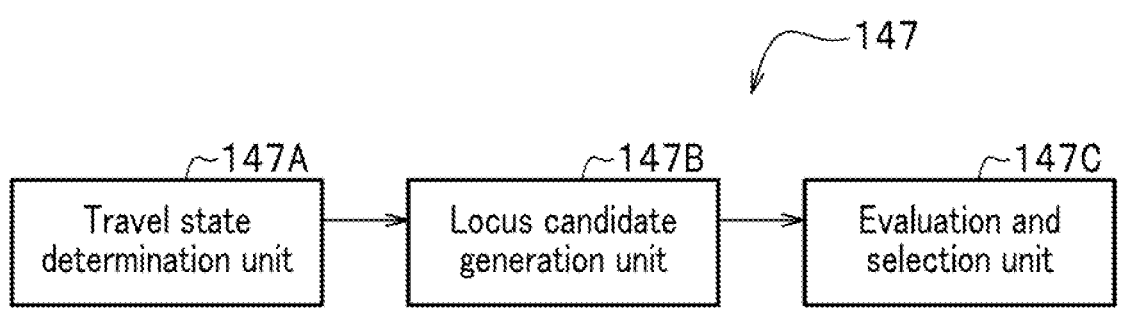
FIG. 6 is a diagram illustrating an example of a configuration of a locus generation unit of the vehicle controller according to the embodiment.

FIG. 6 is a diagram illustrating an example of a configuration of the locus generation unit 147.

As illustrated in FIG. 6, the locus generation unit 147 includes a travel state determination unit 147A, a locus candidate generation unit 147B, and an evaluation and selection unit 147C.

When a lane keeping event is carried out, the travel state determination unit 147A determines the subject vehicle M travels in which one of travel states from among a constant speed travel, a following travel, a low-speed following travel, a deceleration travel, a curve travel, an obstacle avoiding travel, and the like. When, for example, there is not any other vehicle in front of the subject vehicle M, the travel state determination unit 147A determines the travel state as the constant speed travel. When, for example, the subject vehicle M is traveling following a vehicle traveling ahead thereof, the travel state determination unit 147A determines the travel aspect as the following travel. At a traffic jam or the like, the travel state determination unit 147A determines the travel state as the low-speed following travel. When the surrounding area recognition unit 142 recognizes a deceleration of a vehicle traveling ahead thereof or when such an event as stopping and parking is conducted, the travel state determination unit 147A determines the travel state as the deceleration travel. When the surrounding area recognition unit 142 recognizes that the subject vehicle M is approaching a curve, the travel state determination unit 147A determines the travel state as the curve travel. When the surrounding area recognition unit 142 recognizes an obstacle in front of the subject vehicle M, the travel state determination unit 147A determines the travel state as the obstacle avoiding travel.

The locus candidate generation unit 147B generates a locus candidate based on the travel state determined by the travel state determination unit 147A.

Figure 7:
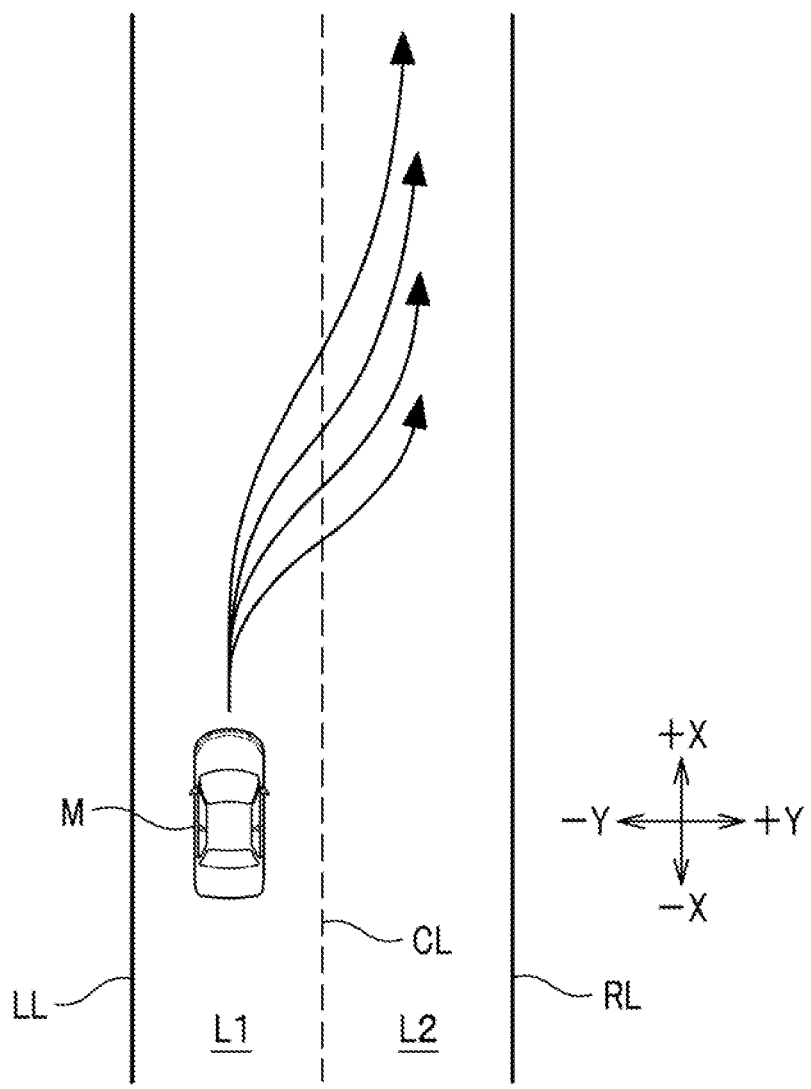
FIG. 7 is a diagram illustrating an example of a locus candidate generated by the locus candidate generation unit of the vehicle controller according to the embodiment.

FIG. 7 is a diagram illustrating an example of a locus candidate generated by the locus candidate generation unit 147B. In the explanation below, X indicates a direction in which a road extends. Y indicates a direction of a vehicle width which is perpendicular to the X direction. A direction+X indicates a direction in which the subject vehicle M travels. A direction−X indicates a direction of a rear side of the subject vehicle M. A direction−Y indicates a leftward direction with respect to the travel direction of the subject vehicle M. A direction+Y indicates a rightward direction with respect to the travel direction of the subject vehicle M.

FIG. 7 illustrates locus candidates generated in a case where the subject vehicle M changes a lane from a first lane L1 to a second lane L2.

The locus candidate generation unit 147B determines loci illustrated in FIG. 7 as a group of target positions (locus points K) to which a reference position (for example, the center of gravity or the center of a rear wheel axis) of the subject vehicle M is to reach at, for example, predetermined time intervals.

Figure 8:
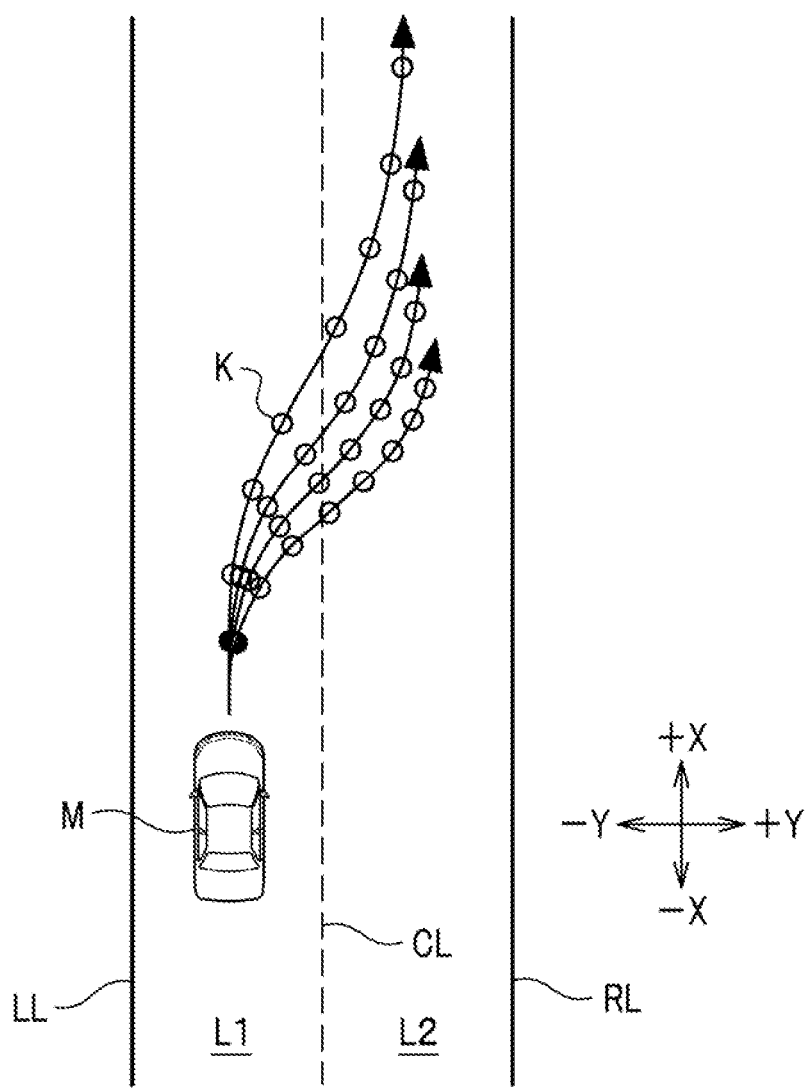
FIG. 8 is a diagram illustrating locus candidates generated by the locus candidate generation unit, as locus points K, of the vehicle controller according to the embodiment.

FIG. 8 is a diagram illustrating locus candidates generated by the locus candidate generation unit 147B as the locus points K. The wider a distance between the locus points K, the higher a speed of the subject vehicle M. The narrower the distance between the locus points K, the lower the speed of the subject vehicle M. Thus, when an acceleration is desired, the locus candidate generation unit 147B gradually makes the distance of the locus points K wider. When a deceleration is desired, the locus candidate generation unit 147B gradually makes the distance of the locus points narrower.

As described above, since the locus point K includes a velocity component, it is required for the locus candidate generation unit 147B to give a target speed to each of the locus points K. The target speed is determined by the travel state determined by the travel state determination unit 147A.

Next is described a technique of determining a target speed when a lane change (including that at a road fork) is performed. First, the locus candidate generation unit 147B sets a lane change target position (or a junction target position). The lane change target position is set as a relative position with respect to a surrounding vehicle and determines "to which position between which surrounding vehicles the subject vehicle M is to change lanes". The locus candidate generation unit 147B determines a target speed for performing the lane change focusing on three surrounding vehicles with respect to the lane change target position set as a reference position.

Figure 9:
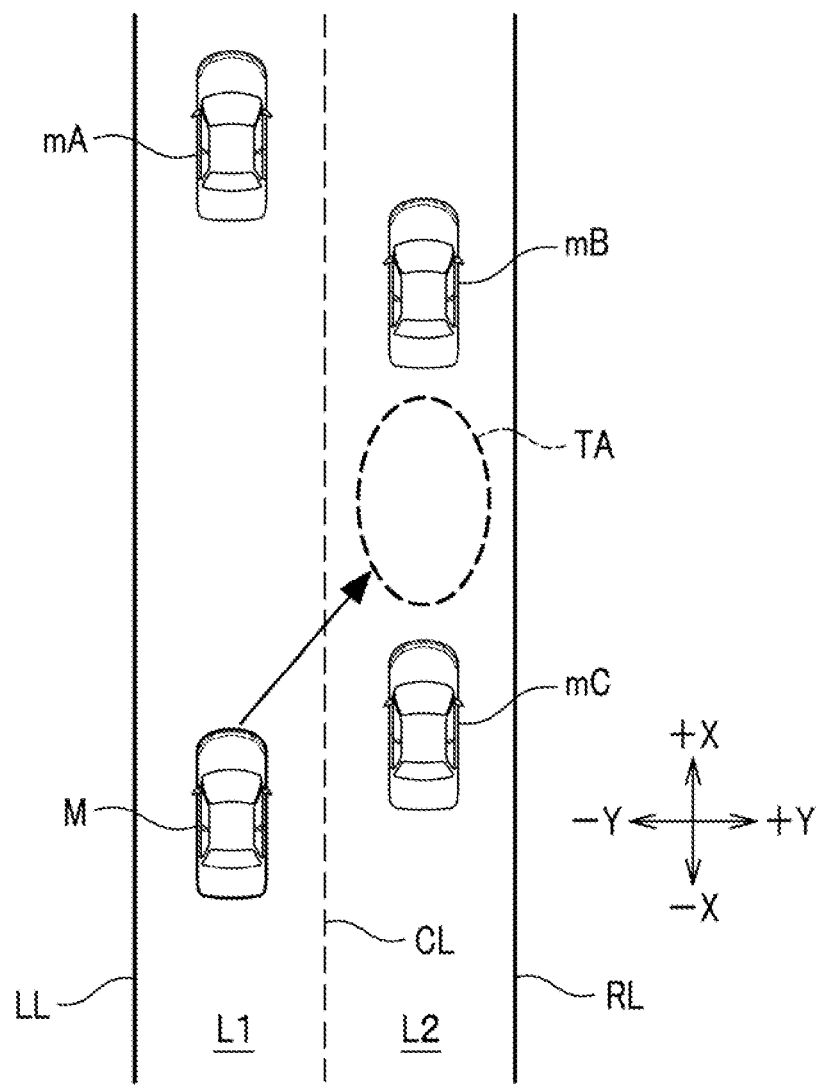
FIG. 9 is a diagram illustrating a lane change target position TA in the vehicle controller according to the embodiment.

FIG. 9 is a diagram illustrating a lane change target position TA. In FIG. 9, L1 indicates a subject lane in which the subject vehicle M is traveling; and L2 indicates a lane next to the lane L1. A vehicle which is traveling just ahead of the subject vehicle M in the same lane as that of the subject vehicle M is referred to as a preceding vehicle mA. A vehicle which is traveling just ahead of the lane change target position TA is referred to as a forward reference vehicle mB. A vehicle which is traveling just behind the lane change target position TA is referred to as a backward reference vehicle mC. The subject vehicle M is required to accelerate or decelerate to travel beside the lane change target position TA. At this time, however, the subject vehicle M has to prevent from catching up with the preceding vehicle mA. The locus candidate generation unit 147B therefore estimates how the three surrounding vehicles are going to travel and determines a target speed of the subject vehicle M, so as not to interfere with the surrounding vehicles.

The evaluation and selection unit 147C evaluates a locus candidate generated by the locus candidate generation unit 147B from, for example, such two viewpoints as planning suitability and safety and selects a locus to be outputted to the travel control part 160. From the viewpoint of the planning suitability, such a locus is highly evaluated that has high followability to a previously created plan (for example, a traveling plan) and a total length of the locus is short. For example, when changing to a right lane is desired, if a locus makes the subject vehicle M once change a lane to the left and return to an original lane, then the locus is poorly evaluated. From the viewpoint of safety, for example, in each locus point, if a distance between the subject vehicle M and an object (a surrounding vehicle or the like) is long and a change in an amount of acceleration, deceleration, or a steering angle is small, the locus is highly evaluated.

Switching Control Unit 150

Referring back to FIG. 2, the switching control unit 150 switches between the automated driving mode and the manual driving mode based on a signal which is inputted from the automated driving switching switch 87 (see FIG. 3), or the like. The switching control unit 150 switches the automated driving mode to the manual driving mode, based on an operation of instructing acceleration, deceleration, or steering to any of the components of the driving operation system in the HMI 70. For example, the switching control unit 150 switches the automated driving mode to the manual driving mode (overriding) when a state continues for a reference period of time or longer, in which an operation amount indicated by a signal inputted from any of the components of the driving operation system in the HMI 70 exceeds a threshold value.

After switching to the manual driving mode by the override, in a case where an operation to the components of the driving operation system in the HMI 70 is not detected for a predetermined period of time, the switching control unit 150 may return the manual driving mode to the automated driving mode. For example, when performing a handover control of shifting to the automated driving mode to the manual driving mode at a scheduled termination point of the automated driving, in order to notify a vehicle occupant of a handover request in advance, the switching control unit 150 outputs information on the described above to the HMI control part 170.

Travel Control Part 1602

The travel control part 160 controls the travel drive force output device 200, the steering device 210, and the brake device 220 such that the subject vehicle M passes through a locus generated by the locus generation unit 147 at a time as scheduled.

HMI Control Part 170

When the HMI control part 170 receives information on the automated driving mode notified from the automated driving control part 120, the HMI control part 170 controls the HMI 70 depending on a type of an automated driving mode by referencing mode-specific operation availability information 184.

The HMI control part 170 references the mode-specific operation availability information 184 based on the mode information acquired from the automated driving control part 120 and thereby determines a device (a part or all of the navigation device 50 and the HMI 70) of which use is allowed, and a device for which use is not allowed. The HMI control part 170 also controls whether or not an operation by a vehicle occupant to the HMI 70 or the navigation device 50 of the non-driving operation system is allowed, based on the determined result.

When, for example, a driving mode performed by the vehicle controller 100 is the manual driving mode, a vehicle occupant operates the driving operation system (for example, the accelerator pedal 71, the brake pedal 74, the shift lever 76, and the steering wheel 78) of the HMI 70. When a driving mode performed by the vehicle controller 100 is the first driving status, the second driving status, or the like, of the automated driving mode, the vehicle occupant has a duty of monitoring the surrounding of the subject vehicle M.

In this case, in order to prevent the vehicle occupant from being distracted (driver distraction) due to an action (for example, an operation of the HMI 70, or the like) other than driving, the HMI control part 170 performs control such that an operation to a part or all of the non-driving operation systems of the HMI 70 by the vehicle occupant is not allowed. At this time, in order to monitor the surrounding of the subject vehicle M, the HMI control part 170 may make the display device 82 display, by means of an image or the like, presence of a surrounding vehicle of the subject vehicle M or a state of the surrounding vehicle, which is recognized by the surrounding area recognition unit 142 and may make the HMI 70 accept a confirmation operation depending on a situation.

When the driving mode is the third driving status of the automated driving, the HMI control part 170 provides control such that restrictions on the driver distraction are eased and that an operation by the vehicle occupant to the non-driving operation system is allowed, which has not been previously allowed. The HMI control part 170 makes, for example, the display device 82 display a video, the speaker 83 output voice, or the contents reproduction device 85 reproduce contents stored in a DVD or the like. Note that the contents reproduced by the contents reproduction device 85 may include various types of contents relevant to amusement or entertainment such as a television program, in addition to the contents in the DVD or the like. The "content reproduction operation" described above with reference to FIG. 6 may represent a content operation relevant to the amusement or entertainment.

When the third driving status shifts to the second driving status or the first driving status, that is, when the mode of the automated driving is changed in which the surrounding monitoring duty of a vehicle occupant is increased, the HMI control part 170 receives a notification from the control state change unit 145 to be described later and makes the navigation device 50 or the HMI 70 of the non-driving operation system output predetermined information. The predetermined information is information indicating that the surrounding monitoring duty is to increase, or information indicating that an allowable degree of an operation to the navigation device 50 or the HMI 70 of the non-driving operation system becomes lowered (the operation is restricted). Note that the predetermined information is not limited thereto and may be, for example, information indicating that a vehicle occupant is prompted to prepare a hand-over control.

As described above, the HMI control part 170 notifies a vehicle occupant that the vehicle occupant owes a duty of monitoring the surrounding of the subject vehicle M at an appropriate timing by, for example, issuing an alarm or the like to the vehicle occupant at, for example, a predetermined time before the driving mode shifts from the third driving status to the second driving status or the first driving status, or before a speed of the subject vehicle M reaches a predetermined speed. As a result, it is possible to provide a time for preparing for switching of the automated driving to the vehicle occupant.

Storage Unit 180

The storage part 180 stores therein information such as, for example, the high-accuracy map information 181, the target lane information 182, the traveling plan information 183, and the mode-specific operation availability information 184. The storage part 180 is realized by a ROM (Read Only Memory), a RAM (Random Access Memory), a HDD (Hard Disk Drive), a flash memory, or the like. The program executed by a processor may be stored in the storage part 180 in advance or may be downloaded from an external device via an in-vehicle Internet equipment or the like. The program may be installed in the storage part 180 by mounting a portable storage medium storing the program in a drive device (not illustrated).

The high-accuracy map information 181 is map information with higher accuracy than that of a navigation map included in the navigation device 50. The high-accuracy map information 181 includes, for example, information on a center of a lane and on a boundary of a lane, or the like. The information on the boundary includes: a type, a color, and a length of a lane marker; widths of a road and a shoulder; widths of a through lane and other lanes; a position of the boundary, a type of the boundary (a guardrail, a planted strip, a roadside edge, or the like), and a zebra crossing.

The high-accuracy map information 181 may also include road information, traffic control information, address information (addresses or postal codes), facility information, telephone number information, or the like. The road information includes: information indicating a type of a road such as an expressway, a toll road, a national road, and a prefectural road; the number of lanes of a road, a width of each lane, a gradient of a road, a position of a road (three-dimensional coordinates including a longitude, a latitude, and an altitude), a curvature of a curve in a lane, a position of a junction and a fork in a lane, and a traffic sign installed on a road. The traffic control information includes information on a closed lane due to construction, traffic accidents, a traffic jam, or the like.

Outline of Shift of Control Statuses

Figure 10:
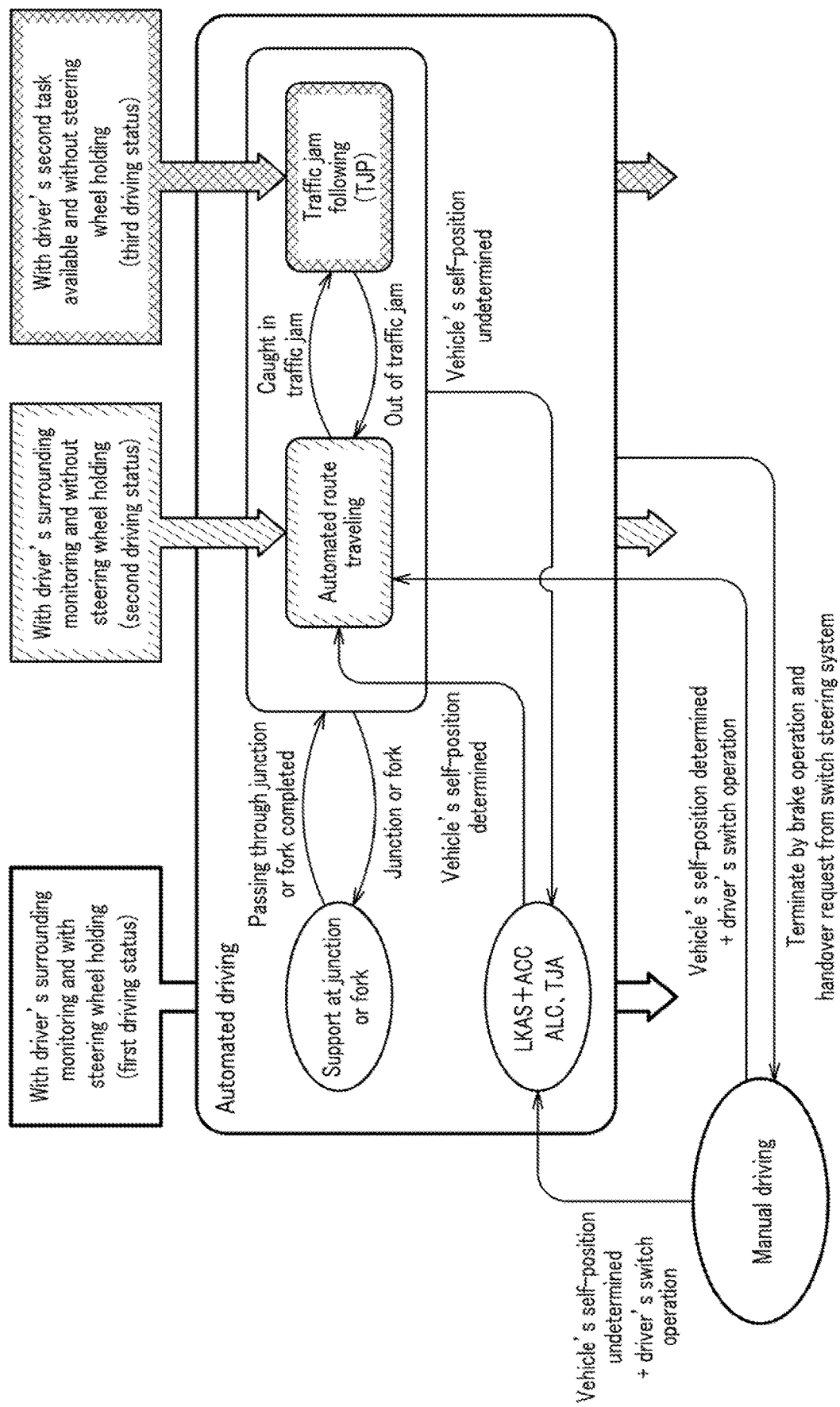
FIG. 10 is a diagram illustrating an outline of shift of control statuses in the vehicle controller according to the embodiment.

FIG. 10 is a diagram illustrating an outline of a shift of control statuses.

As illustrated in FIG. 10, a vehicle including the vehicle controller 100 has statuses of "manual driving" and "automated driving". A shift from "manual driving" to "automated driving" is performed in response to "undetermined subject vehicle's position+driver's switch operation". A shift from "automated driving" to "manual driving" is performed in response to "terminate by brake operation and handover request from switch steering system".

"Automated driving" includes, for example: a first driving status with driver's surrounding monitoring and with steering wheel holding; a second driving status with driver's surrounding monitoring and without steering wheel holding; and a third driving status with an automated degree higher than that of the second driving status or a driving task less than that of the second driving status, with a driver's second task (see FIG. 6 to be described hereinafter) available, and without steering wheel holding.

As illustrated in FIG. 10, the first driving status includes "support at junction or fork" and "LKAS+ACC, ALC, and TJA". "Junction or fork" from the second driving status and the third driving status shifts the driving status to "support at junction or fork" of the first driving status. "Passing junction or fork" from the second driving status and the third driving status shifts the driving status to "support at junction or fork" in the first driving status. "Passing through junction or fork completed" shifts the driving status to the second driving status or the third driving status.

"LKAS+ACC, ALC, TJA" in which a vehicle's self-position is determined, at the first driving status, or "vehicle's self-position determined+driver's switch operation" in "manual driving" shifts the status to "automated route traveling" at the second driving status.

The first driving status automatically shifts to the second driving status. Even when an input of a MAIN/SET button operation is received on an expressway, the driving status always starts at the first driving status. The manual driving status does not directly shift to the second driving status.

A shift from the first driving status is subject to determination of a self-position in a through lane on an expressway. Also, the determination of the self-position requires that the self-position is measured by means of the GPS or the like and that a shape of the road detected by an autonomous sensor such as the camera 10 matches that of a high-accuracy map.

When the driving status is shiftable to the third driving status, "caught in traffic jam" in "automated route traveling" at the second driving status shifts the driving status to "traffic jam following (TJP)" at the third driving status. "Out of traffic jam" in "traffic jam following (TJP)" at the third driving status shifts the driving status to "automated route traveling" at the second driving status.

Even when a driver holds a steering wheel at the second driving status or the third driving status, the driving status is not shifted. If, however, steering inputs are performed a predetermined number of times or more, the driving status is shifted to the "LKAS+ACC, ALC, and TJA" at the first driving status.

Outline of Control State

Figure 11:
FIG. 11 is a diagram illustrating an example of mode-specific operation availability information in the vehicle controller according to the embodiment.

FIG. 11 is a diagram illustrating an example of the mode-specific operation availability information 184.

The mode-specific operation availability information 184 illustrated in FIG. 11 includes, each as an item of driving mode, "manual driving mode" and "automated driving mode". "Automated driving mode" includes the "first driving status", the "second driving status", the "third driving status", or the like as described above.

The mode-specific operation availability information 184 includes, each as an item of the non-driving operation system: "navigation operation" which is an operation to the navigation device 50; "content reproducing operation" which is an operation to the content reproducing device 85, "instrument panel operation" which is an operation to the display 82, or the like. In the example of the mode-specific operation availability information 188 illustrated in FIG. 11, availability of an operation performed by a vehicle occupant with respect to the non-driving operation system is set for each of the driving modes described above. A target interface device is not, however, limited to this.

Travel Drive Force Output Device 200, Steering Device 210, and Brake Device 220

Referring back to FIG. 2, the vehicle controller 100 includes the travel drive force output device 200, the steering device 210, and the brake device 220.

Travel Drive Force Output Device 200

The travel drive force output device 200 outputs a travel drive force (a torque) required for a vehicle to travel, to a drive wheel. For example, when the subject vehicle M is a vehicle which has an internal combustion engine as a power source, the travel drive force output device 200 includes an engine, a transmission, and an engine electronic control unit (ECU) which controls the engine. When the subject vehicle M is an electric vehicle which has an electric motor as the power source, the travel drive force output device 200 includes a travel motor and a motor ECU which controls the travel motor. When the subject vehicle M is a hybrid vehicle, the travel drive force output device 200 includes an engine, a transmission, an engine ECU, a travel motor, and a motor ECU.

When the travel drive force output device 200 includes only an engine, an engine ECU adjusts a throttle opening of the engine, a shift stage, or the like in accordance with information inputted from a travel control part 160 to be described later. When the travel drive force output device 200 includes only a travel motor, a motor ECU adjusts a duty ratio of a PWM signal given to the travel motor in accordance with information inputted from the travel control part 160. When the travel drive force output device 200 includes both an engine and a travel motor, an engine ECU and a motor ECU control the travel drive force in cooperation with each other in accordance with information inputted from the travel control part 160.

Steering Device 210

The steering device 220, for example, includes a steering ECU and an electric motor. The electric motor changes a direction of a steering wheel by, for example, applying a force to a rack and pinion mechanism. The steering ECU drives the electric motor based on information inputted from the vehicle controller 100 or inputted information on a steering angle or a steering torque, to thereby change the direction of the steering wheel.

Brake Device 220

The brake device 220 includes, for example: a brake caliper; a cylinder which transmits hydraulic pressure to the brake caliper; an electric motor which generates hydraulic pressure in the cylinder; and an electric servo brake device which includes a brake control unit. The brake ECU controls the electric motor based on information inputted from the travel control part 160 such that a brake torque based on a braking operation is outputted to each wheel. The electric servo brake device may include a mechanism which transmits hydraulic pressure generated by an operation of a brake pedal included to the cylinder via a master cylinder, as a backup.

The brake device 220 is not limited to the electric servo brake device described above and may be an electronic control-type hydraulic brake device. The electronic control-type hydraulic brake device controls an actuator based on information inputted from the travel control part 160 such that hydraulic pressure of the master cylinder is transmitted to the cylinder. The brake device 220 may include a regenerative brake using a travel motor which may be included in the travel drive force output device 200.

Next are described operations of the vehicle controller 100 having the configuration as described above.

Basic Operations of Vehicle Control Processing of Vehicle Controller 100

Figure 12:
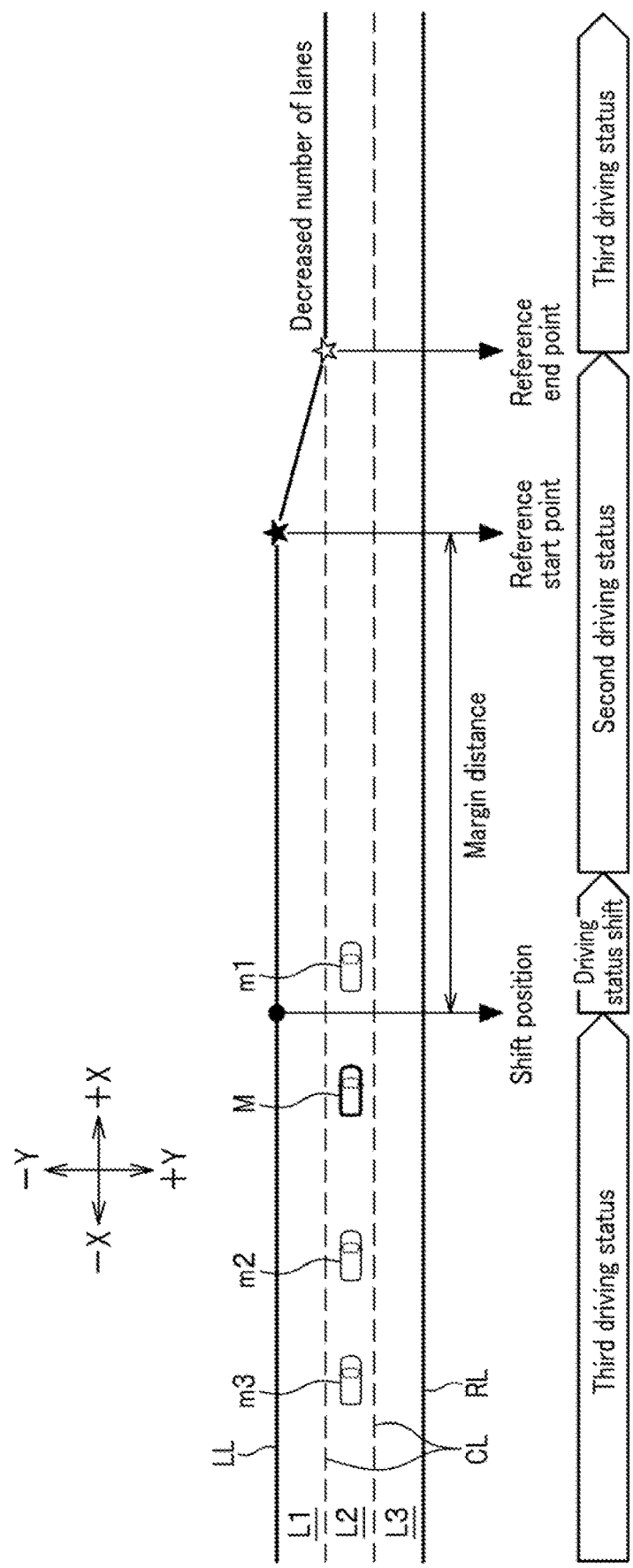
FIG. 12 is a diagram illustrating a scene of decrease in the number of lanes when an automated driving is performed on an expressway, in the vehicle controller according to the embodiment.

FIG. 12 is a diagram illustrating a scene of a decrease in the number of lanes when an automated driving is performed on an expressway. In FIG. 12: a first lane L1 is a travel lane defined by a lane marking LL and a lane marking CL; a second lane L2 is a travel lane defined by the lane marking CL and another lane marking CL; and a third lane L3 is a fast lane defined by another lane marking CL and a lane marking RL, all of which are the lanes in which a vehicle travels in a direction+X. The lanes L1 to L3 are adjacent to each other for vehicles travelling in the same direction. There is a road shoulder on the left of the first lane L1. Though not illustrated, there is an oncoming lane with respect to the lanes L1 to L3 (that is, a lane in which a vehicle travels in an−X direction). Note that even when a shoulder is present on a right side of a lane in which the subject vehicle M travels due to a difference in traffic directionality, description below is applicable by interchanging right and left.

In the example illustrated in FIG. 12, the number of lanes is reduced from three (L1, L2, and L3) to two (L2 and L3). A position at which the lane reduction starts is herein referred to as a "reference start point" (see a mark ★ in FIG. 12); and, a position at which the lane reduction ends, a "reference end point" (see a mark ☆ in FIG. 12).

Shift From Third Driving Status to Second Driving Status

In the specific area (an interchange, a junction, the number of lanes increased or decreased, or the like (including a fork)), the first lane L1 is a lane which leads to a decrease in the number of the lanes. The second lane L2 is a lane adjacent to the first lane L1. The third lane L3 is a fast lane which does not lead to an increase or a decrease in the number of the lanes. The subject vehicle M is traveling in the second lane L2 with an automated driving mode thereof at the third driving status. In the second lane L2: a first vehicle m1 is traveling ahead of the subject vehicle M; and second and third vehicles m2, m3 are traveling behind the subject vehicle M.

As illustrated in an upper portion of FIG. 12, a position which is situated a "margin distance" short of the "reference start point" (see the mark ★ in FIG. 12) is referred to as a "shift position" (see a mark ● in FIG. 12) of a driving status. The margin distance is used when a shift of a driving status from the third driving status to the second driving status is started. In FIG. 12, the subject vehicle M is not yet approaching the "shift position".

(1) As illustrated in a lower portion of FIG. 12, when the number of lanes is decreased (from three to two), the driving status shifts from the third driving status to the second driving status at the "shift position" which is situated a predetermined distance short of the "reference start position" of the lane decrease point. During the shift from the third driving status to the second driving status, a time for "driving status shift" is set, so as to allow a driver of the subject vehicle M to have an extra time to be ready for the "driving status shift".

(2) As illustrated in the lower portion of FIG. 12, the driving status is shifted again from the second driving status to the third driving status at the "reference end position", if a traffic jam occurs there. After passing through the specific area, it is possible to shift the driving status to a more highly automated level.

(3) If a lane in which the subject vehicle M is traveling is not adjacent to a lane related to the decrease, the subject vehicle M keeps on traveling at the third driving status. The subject vehicle M is not required to change the driving status because it is highly likely that a vehicle traveling ahead thereof remains unchanged.

As described in (2) or (3), the third driving status can be performed again: when the subject vehicle M has passed through a specific scene in which a lane in which the subject vehicle M is adjacent to an exit of an interchange, a junction, or a merging point; or when the subject vehicle M has shifted to a lane not adjacent to the specific scene.

(4) When the subject vehicle M is passing through a specific area, if a lane in which the subject vehicle M is traveling leads to the area at which the number of lanes is increased or decreased (in the example of FIG. 12, a decrease in the number of lanes), the subject vehicle M shifts the driving status from the third driving status to the second driving status; and, if a lane in which not the subject vehicle M but another vehicle is traveling leads to the area at which the number of lanes is increased or decreased (in the example of FIG. 12, the decrease in the number of lanes), the subject vehicle M maintains traveling at the third driving status. That is, when a change in the number of lanes is independent of the subject vehicle M, the subject vehicle M can continue a level of the driving status and can travel at a highest possible driving status.

(5) If a lane in which the subject vehicle M is traveling leads to the specific area in which the number of lanes is increased or decreased, the subject vehicle M shifts the driving status thereof from the third driving status to the second driving status; and, if the subject vehicle M changes a lane to another, the subject vehicle M re-shifts the driving status thereof from the second driving status to the third driving status. That is, the subject vehicle M can re-shift the driving status thereof to a higher level if a vehicle traveling ahead thereof remains unchanged.

(6) The subject vehicle M sets a re-shift start distance in the second lane L2, at which the subject vehicle M is allowed to start a re-shifting to the third driving status when passing through a specific area, is set larger than that in the first lane L1. That is, a distance of restricting a shift from the second driving status to the third driving status is made larger than that from the third driving status to the second driving status. This is because other vehicle is expected to shift from the first lane to the second lane after passing through the specific area. The larger restricted distance during traveling in the second lane L2 makes it possible to perform an automated driving with more stability.

(7) When the specific area has: a first lane L1 which leads to an area at which the number of lanes is increased or decreased; and a second lane L2 which is adjacent to the first lane L1, the subject vehicle M determines a shift position which is situated a predetermined distance short of the specific area and at which the subject vehicle M shifts the driving status thereof from the third driving status to the second driving status. The subject vehicle M also sets a prescribed distance during a travel in the first lane L1 larger than that in the second lane L2. Such a change in a level of automated driving for each of the lanes makes it possible to maintain the highest possible automated driving.

Shift From Second Driving Status to Third Driving Status (1) When the subject vehicle M enters the specific area and is traveling at the second driving status, the subject vehicle M keeps on traveling at the second driving status.

(2) After the subject vehicle M passes through an area in which the number of through lanes is increased or decreased, the subject vehicle M detects whether or not there is a specific area within a predetermined distance. If no specific area is detected, the subject vehicle M re-shifts the driving status thereof from the second driving status to the third driving status. In other words, when the subject vehicle M travels at the second driving status and is caught in a traffic jam scene, the subject vehicle M shifts the driving status to the third driving status. That is, if there is no specific area within the prescribed distance, the subject vehicle M re-shifts the driving status thereof and can travel at the highest possible driving status.

(3) After the subject vehicle M shifts the driving status from the third driving status to the second driving status in a case where a lane in which the subject vehicle M is traveling leads to the specific area in which the number of lanes is increased or decreased, if the subject vehicle M shifts from a presently-traveling first lane to a second lane different from the first lane, the subject vehicle M re-shifts the driving status from the second driving status to the third driving status. That is, the subject vehicle M can re-shift the driving status to a higher-level one, if a vehicle traveling ahead thereof remains unchanged.

Figure 13:
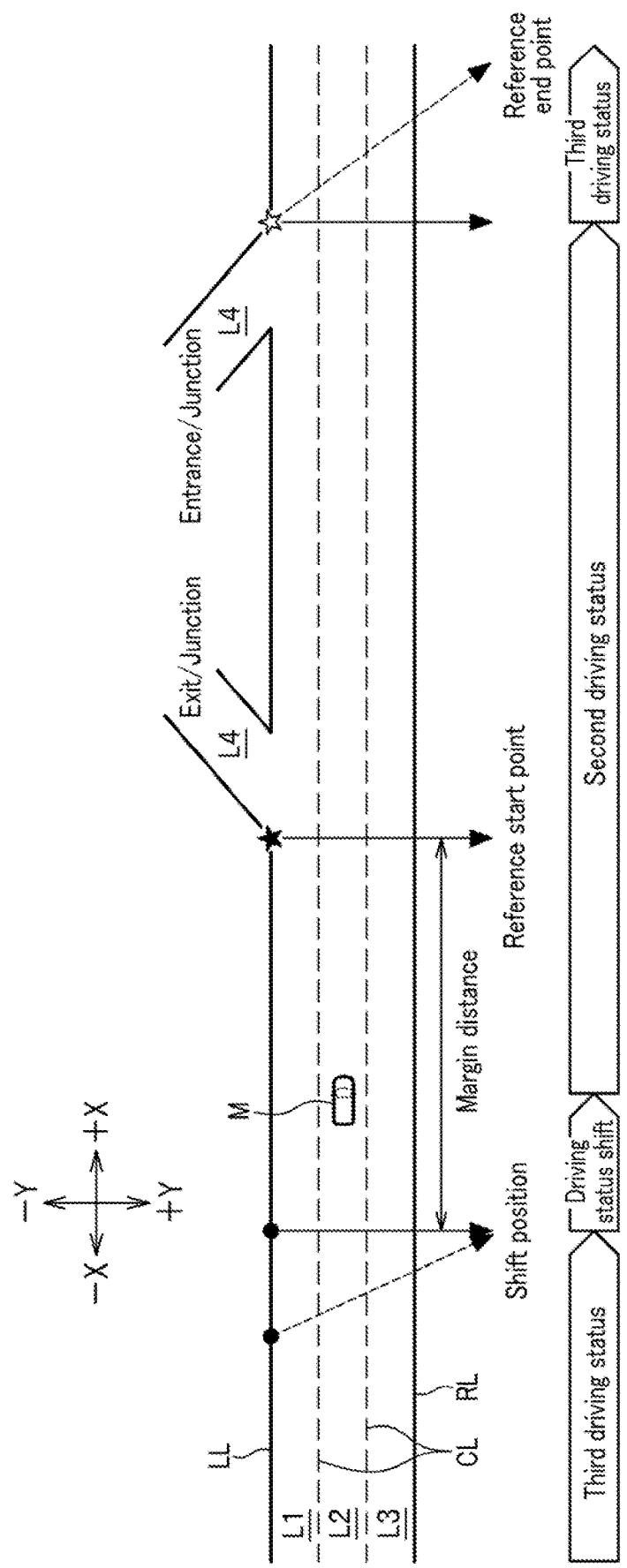
FIG. 13 is a diagram illustrating an exit or junction scene in an automated driving on an expressway in the vehicle controller according to the embodiment.

FIG. 13 is a diagram illustrating an exit or junction scene in an automated driving on an expressway. The same reference numerals are given to the components same as those in FIG. 12, and description thereof is omitted herein.

In an example illustrated in FIG. 13, a vehicle can turn off from one of three through lanes (L1, L2, L3) to an exit or a junction or can merge from an entrance or a junction to one of the through lanes. A point at which a fork point starts is referred to as a "reference start point" (see a mark ★ in FIG. 13); and a merging point is referred to as a "reference end point" (see a mark ☆ in FIG. 13).

Shift From Second Driving Status to First Driving Status

As described above, the specific area herein means an area in which, when the subject vehicle M is traveling in a through lane and reaches the specific area, the number of lanes is increased (including a road fork) or decreased.

In a specific area (an interchange, a junction, or a decrease in the number of lanes), the first lane L1 is a lane leading from a through lane to a fork and from the fork to the through lane. The second lane L2 is a lane adjacent to the first lane L1. The third lane L3 is a fast lane which is independent of the increase or decrease in the number of the lanes.

The subject vehicle M is in the specific area. An automated driving mode of the subject vehicle M has been brought down from the third driving status to the second driving status. The subject vehicle M is currently traveling in the second lane L2 at the second driving status.

Shift From First Driving Status to Second Driving Status (1) When the subject vehicle M enters the specific area and is traveling at the second driving status, the subject vehicle M keeps on traveling at the second driving status.

(2) After the subject vehicle M passes through an area in which the number of through lanes is increased or decreased, the subject vehicle M detects whether or not there is a specific area within a predetermined distance. If no specific area is detected, the subject vehicle M re-shifts the driving status thereof from the second driving status to the third driving status. That is, if there is no specific area within the prescribed distance, the subject vehicle M re-shifts the driving status thereof and can travel at the highest possible driving status.

(3) After the subject vehicle M shifts the driving status from the third driving status to the second driving status in a case where, a lane in which the subject vehicle M is traveling leads to the specific area in which the number of lanes is increased or decreased, if the subject vehicle M shifts from a presently-traveling first lane to a second lane different from the first lane, the subject vehicle M re-shifts the driving status from the second driving status to the third driving status. That is, the subject vehicle M can re-shift the driving status to a higher-level one, if a vehicle traveling ahead thereof remains unchanged.

(4) When the specific area has: a first lane L1 which leads to the area at which the number of lanes is increased or decreased; and a second lane L2 which is adjacent to the first lane L1, the subject vehicle M determines a shift position which is situated a predetermined distance short of the specific area and at which the subject vehicle M shifts the driving status thereof from the third driving status to the second driving status. The subject vehicle M also sets a prescribed distance during a travel in the first lane L1 larger than that in the second lane L2. Such a change in a level of automated driving for each of the lanes makes it possible to maintain the highest possible automated driving.

(5) The subject vehicle M sets a re-shift start distance in a lane, at which the subject vehicle M is allowed to start a re-shifting to the third driving status, when passing through the specific area. At this time, the subject vehicle M sets the re-shift start distance in the second lane L2 larger than that in the first lane L1. This is because other vehicle is expected to shift from the first lane to the second lane, after passing through the specific area. The larger restricted distance during traveling in the second lane L2 makes it possible to perform an automated driving with more stability.

Figure 14:
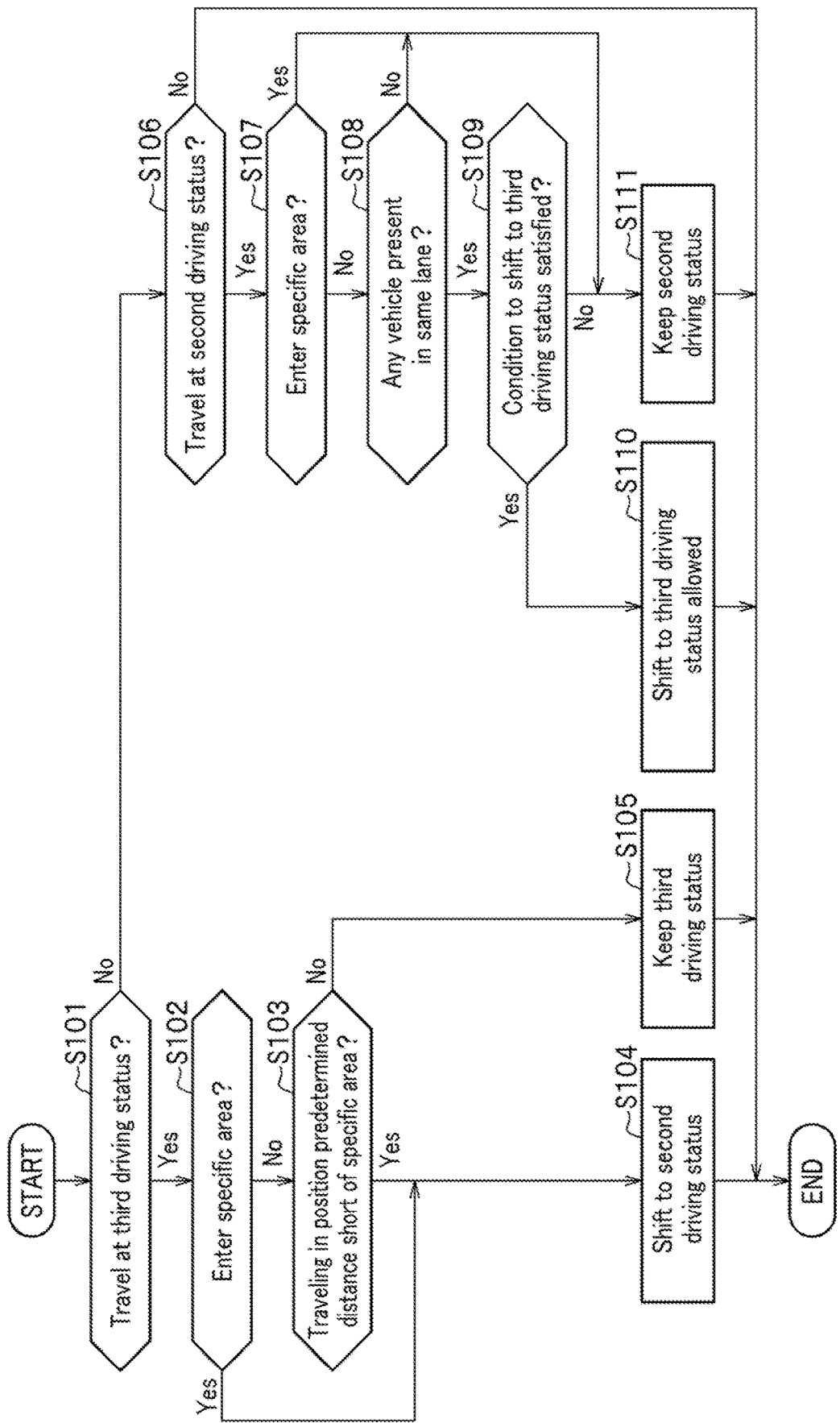
FIG. 14 is a basic flowchart illustrating a vehicle control processing performed by the vehicle controller according to the embodiment.

FIG. 14 is a basic flowchart illustrating a vehicle control processing performed by the vehicle controller 100. The automated driving control part 120 (see FIG. 2) repeatedly executes the flowchart on a predetermined cycle.

In step S101, the control state change unit 145 of the automated driving control part 120 determines whether or not the subject vehicle M is traveling at the third driving status. If the subject vehicle M is determined to be traveling at the third driving status, the processing advances to step S102. If the subject vehicle M is not determined to be traveling at the third driving status, the processing advances to step S106.

In step S102, the control state change unit 145 determines whether or not the subject vehicle M has entered a specific area (an interchange, a junction, the number of lanes increased or decreased, or the like).

If the subject vehicle M is not determined to have entered the specific area (in step S102: No), in step S103, the control state change unit 145 determines whether or not the subject vehicle M is traveling in a position a predetermined distance short of the specific area, and the processing advances to step S104. If the subject vehicle M is determined to have entered the specific area (in step S102: Yes), the processing advances to step S104.

If, in step S102, the subject vehicle M is determined to have entered the specific area or, if, in step S103, the subject vehicle M is determined to be traveling in the position a predetermined distance short of the specific area, the subject vehicle M shifts the driving status thereof to the second driving status in step S104 and the processing of the flowchart terminates.

Figure 15:
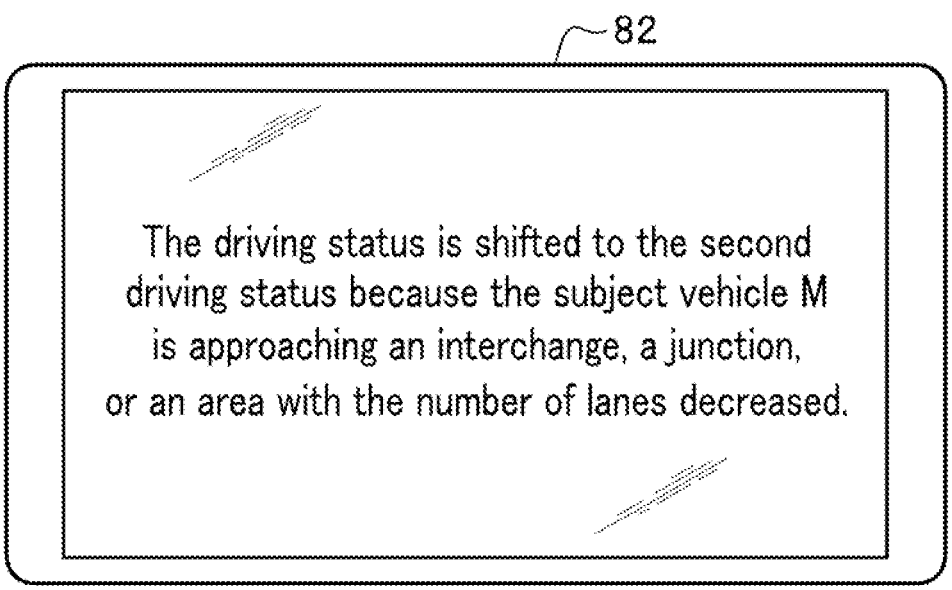
FIG. 15 is a diagram illustrating an example of shift notification information outputted by a navigation device or a HMI of the vehicle controller according to the embodiment.

FIG. 15 is a diagram illustrating an example of shift notification information outputted by the navigation device 50 or the HMI 70. The HMI control part 170 provides control on the navigation device 50 or the HMI 70 such that a vehicle occupant is notified via an image or speech that the subject vehicle M shifts the driving status from the third driving status down to the second driving status. In this example, the navigation device 50 or the HMI 70 notifies the vehicle occupant of the shift via an image or speech indicating that "the driving status is shifted to the second driving status because the subject vehicle is approaching an interchange, a junction, or an area with the number of the lanes decreased".

Referring back to the flowchart of FIG. 14, if, in step S103, the subject vehicle M is not determined to be traveling in the position a predetermined distance short of the specific area (step S103: No), the processing advances to step S105. In step S105, the subject vehicle M keeps on traveling at the third driving status and the processing of this flowchart terminates.

If, in step S101, the subject vehicle M is not determined to be traveling at the second driving status (step S101: No), then, in step S106, the control state change unit 145 determines whether or not the subject vehicle M is traveling at the second driving status.

In step S106, the control state change unit 145 determines whether or not the subject vehicle M is traveling at the second driving status. If the subject vehicle M is determined to be traveling at the second driving status, the processing advances to step S107. If the subject vehicle M is not determined to be traveling at the second driving status, the processing of this flowchart terminates.

In step S107, the control state change unit 145 determines whether or not the the subject vehicle M has entered a specific area. If the subject vehicle M is not determined to have entered the specific area (step S107: No), then, in step S108, the control state change unit 145 determines whether or not any vehicle is present which is recognized by the surrounding area recognition unit 142 in a lane in which the subject vehicle M is traveling. That is, a shift from the second driving status to the third driving status makes it a condition that the surrounding area recognition unit 142 recognizes any vehicle traveling ahead of the subject vehicle M (in a lane same as that of the subject vehicle M). The condition is made so as to avoid an abrupt shift of the driving status.

If it is determined that a vehicle is present which is recognized by the surrounding area recognition unit 142 in a lane in which the subject vehicle M is traveling (step S108: Yes), then, in step S109, the control state change unit 145 determines whether or not a condition to shift to the third driving status (such as a TJP control start condition) is satisfied.

If a condition to shift to the third driving status is determined to be satisfied (step S109: Yes), then, in step S110, a shift to the third driving status is allowed and the processing of this flowchart terminates.

If a condition to shift to the third driving status is not determined to be satisfied (step S109: No), the processing advances to step S111.

If, in step S107, the subject vehicle M is determined to have entered the specific area (step S107: No); or if, in step S108, it is not determined that a vehicle is present recognized by the surrounding area recognition unit 142 in the lane in which the subject vehicle M is traveling; or if, in step S109, the condition to shift to the third driving status is not determined to be satisfied, then, in step S111, the control state change unit 145 keeps the driving status at the second driving status and the processing of this flowchart terminates.

As explained with reference to the flowchart of FIG. 14, when the subject vehicle M is traveling in a lane which leads to an area at which the number of lanes is increased or decreased (for example, from three to two in FIG. 12), the vehicle controller 100 shifts the driving status of the subject vehicle M from the third driving status to the second driving status, at the margin distance which is a predetermined distance short of an area from which the number of lanes is reduced. A shift from the first driving status to the second driving status makes it a condition that the surrounding area recognition unit 142 recognizes a vehicle traveling ahead of the subject vehicle M (in a lane same as that of the subject vehicle M). A level of the automated driving is changed with a fork, a junction, or a decrease in the number of lanes. The configuration described above makes it possible to avoid an abrupt shift of the driving status.

Operations of Vehicle Control Processing ("Re-Shift After Change in Lane Situation") of Vehicle Controller 100

Next is described an example of restoring the driving status after a change in a lane situation.

Figure 16:
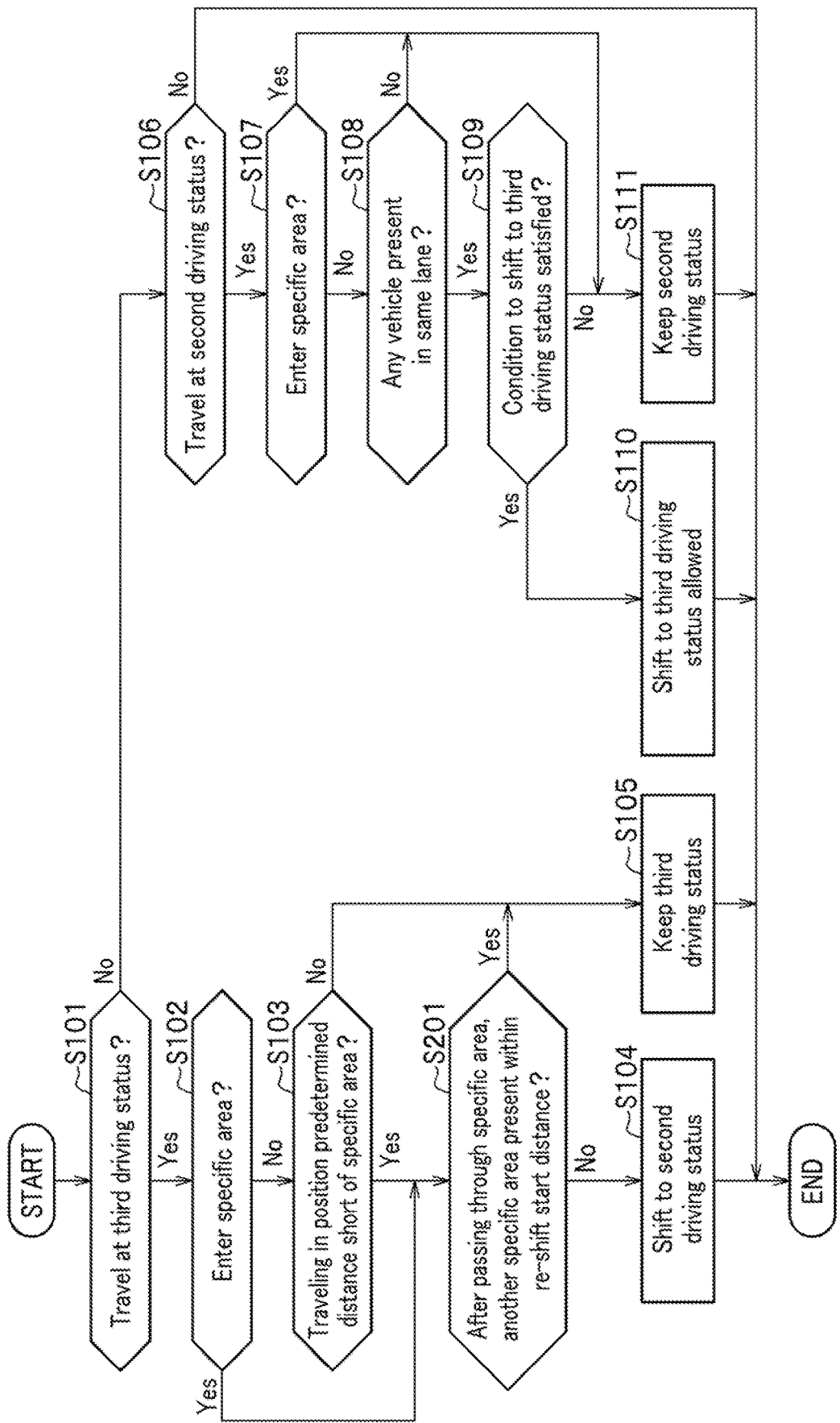
FIG. 16 is a flowchart illustrating an example of a vehicle control processing ("re-shift after change in lane state") performed by the vehicle controller according to the embodiment.

FIG. 16 is a flowchart illustrating an example of a vehicle control processing ("re-shift after change in lane situation") performed by the vehicle controller 100. Same step numbers are given to steps same as those in FIG. 14, and a duplicate description of those steps is omitted herein.

If, in step S102, the subject vehicle M is determined to have entered a specific area (an interchange, a junction, or the number of lanes increased or decreased) (step S102: Yes), or if, in step S103, the subject vehicle M is determined to be traveling a predetermined distance short of the specific area (step S103: Yes), then, in step S201, the control state change unit 145 determines, after passing through the specific area, whether or not another specific area is present (for example, similar to or relevant to the having-already-passed specific area) within a re-shift start distance.

If, after passing through the specific area, another specific area is not determined to be present within the re-shift start distance, the processing advances to step S104. If, after passing through the specific area, another specific area is determined to be present within the re-shift start distance, the processing advances to step S105.

As a result of the determination in step S201, if, after passing through the specific area, another specific area is determined to be present within the re-shift start distance, the subject vehicle M can re-shift the driving status thereof from the second driving status to the third driving status.

That is, if another specific area is not determined to be present within the re-shift start distance, the subject vehicle M can re-shift the driving status thereof to the highest possible level.

Operations of Vehicle Control Processing ("Traffic Jam After Passing Through") of Vehicle Controller 100

An example of re-shifting to TJP when a traffic jam occurs again is described below.

Figure 17:
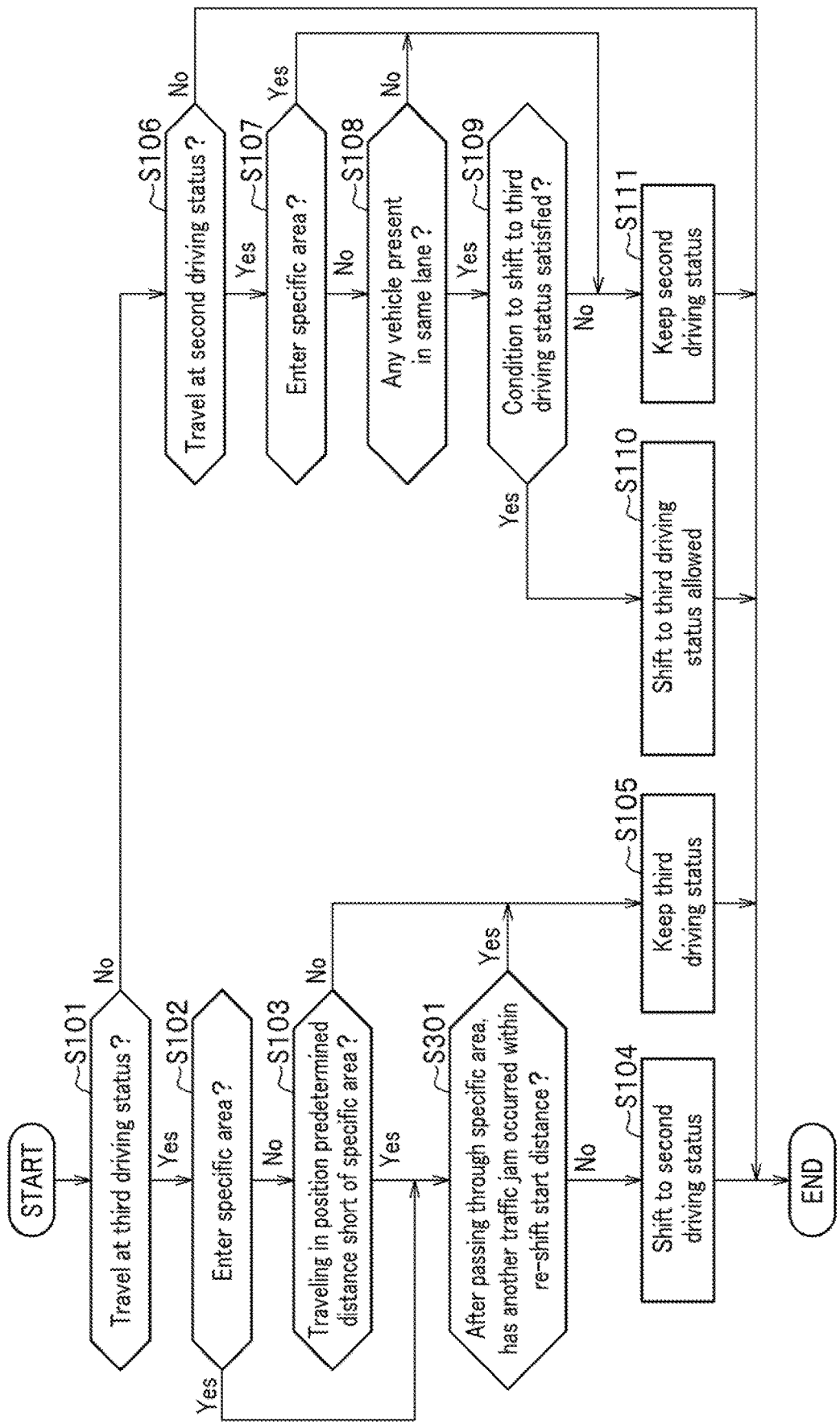
FIG. 17 is a flowchart illustrating an example another vehicle control processing ("traffic jam after passing through") in the vehicle controller according to the embodiment.

FIG. 17 is a flowchart illustrating an example of a vehicle control processing ("traffic jam after passing through")

performed by the vehicle controller 100. Same step numbers are given to steps same as those in FIG. 14, and a duplicate description of those steps is omitted herein.

If, in step S102, the subject vehicle M is determined to have entered a specific area (an interchange, a junction, or the number of lanes increased or decreased) (step S102: Yes), or if, in step S103, the subject vehicle M is determined to be traveling a predetermined distance short of the specific area (step S103: Yes), then, in step S301, the control state change unit 145 determines whether or not a traffic jam has occurred within a re-shift start distance, after passing through the specific area.

If a traffic jam is not determined to have occurred within the re-shift start distance, after passing through the specific area, the processing advances to step S104. If a traffic jam is determined to have occurred within the re-shift start distance, after passing through the specific area, the processing advances to step S105.

As a result of the determination in step S301, when the traffic jam has occurred within the re-shift start distance, after passing through the specific area, the subject vehicle M can re-shift the driving status from the second driving status to the third driving status.

As described above, if the traffic jam has occurred within the re-shift start distance, after passing through the specific area, the subject vehicle M re-shifts the driving status thereof and then travels at the second driving status on a congested expressway, following a vehicle traveling ahead thereof. This makes it possible to realize a safe automated driving.

Operations of Vehicle Control Processing ("Determination Depending on Lane") of Vehicle Controller 100

Next is described an example of keeping same level of the driving status, if a lane in which the subject vehicle M travels is not a lane leading to an area at which the number of lanes is increased or decreased.

FIG. 18 a flowchart illustrating an example of a vehicle control processing ("determination depending on lane") performed by the vehicle controller 100. Same step numbers are given to steps same as those in FIG. 14, and a duplicate description of those steps is omitted herein.

If, in step S102, the subject vehicle M is determined to have entered a specific area (an interchange, a junction, or the number of lanes increased or decreased) (step S102: Yes), or if, in step S103, the subject vehicle M is determined to be traveling a predetermined distance short of the specific area (step S103: Yes), then, in step S401, the control state change unit 145 determines whether or not the lane in which the subject vehicle M is traveling leads to the specific area in which the number of lanes is increased or decreased.

If the lane in which the subject vehicle M is traveling is determined to lead to the specific area in which the number of lanes is increased or decreased, the processing advances to step S104. If the lane in which the subject vehicle M is traveling is not determined to lead to the specific area in which the number of lanes is increased or decreased, the processing advances to step S105.

As a result of the determination in step S401, when the lane in which the subject vehicle M is traveling is not determined to lead to the specific area in which the number of lanes is increased or decreased, the subject vehicle M can re-shift the driving status thereof from the second driving status to the third driving status (or continues traveling at the third driving status).

As described above, if a lane other than that in which the subject vehicle M is traveling leads to the specific area in which the number of lanes is increased or decreased, the subject vehicle M keeps on traveling at the second driving status. That is, if the lane in which the subject vehicle M is traveling does not lead to the specific area in which the number of lanes is increased or decreased, the subject vehicle M can travel at the highest possible driving status.

Operations of Vehicle Control Processing ("Shift From Lane Leading to Specific Area to Another") of Vehicle Controller 100

Next is described an example in which the driving status is raised when the subject vehicle M has shifted from a lane leading to a specific area to another not leading to the specific area.

FIG. 19 is a flowchart illustrating an example of a vehicle control processing performed by the vehicle controller 100 ("shift from lane leading to specific area to another"). Same step numbers are given to steps same as those in FIG. 14, and a duplicate description of those steps is omitted herein.

If, in step S102, the subject vehicle M is determined to have entered a specific area (an interchange, a junction, or the number of lanes increased or decreased) (step S102: Yes), or if, in step S103, the subject vehicle M is determined to be traveling a predetermined distance short of the specific area (step S103: Yes), then, in step S501, the control state change unit 145 determines whether or not the subject vehicle M has shifted to another lane which does not lead to the specific area at which the number of lanes is increased or decreased.

If the subject vehicle M is not determined to have shifted to another lane which does not lead to the specific area in which the number of lanes is increased or decreased, the processing advances to step S104. If the subject vehicle M is determined to have shifted to another lane which does not lead to the specific area in which the number of lanes is increased or decreased, the processing advances to step S105.

As a result of the determination in step S501, if the subject vehicle M has shifted to another lane which does not lead to the specific area in which the number of lanes is increased or decreased, the subject vehicle M can re-shift the driving status thereof from the second driving status to the third driving status (the subject vehicle M can keep on traveling at the third driving status). That is, the subject vehicle M can re-shift the driving status to a higher level, if a vehicle traveling ahead of the subject vehicle M remains unchanged.

Note that the above-described another lane is a lane which does not lead to an area at which the number of lanes is increased or decreased. The another lane includes a lane different from the lane in which the subject vehicle M is traveling. Even when a lane to which the subject vehicle M has shifted leads to an area at which the number of lanes is increased or decreased, a similar shift therefrom is possible.

Operations of Vehicle Control Processing ("Change in Margin Distance Depending on Lane") Performed by Vehicle Controller 100

Next is described an example in which a margin distance is changed depending on a lane.

The automated driving control part 120 (see FIG. 2) determines a shift of interest is that from the second driving status to the first driving status. If the shift is determined to be a shift from the second driving status to the first driving status, the automated driving control part 120 sets a distance D1 as a prescribed distance D short of a specific area. The automated driving control part 120 determines whether or not the shift of interest is a shift from the first driving status to the second driving status. If the shift is a shift from the first driving status to the second driving status, the automated driving control part 120 sets a distance D2 (D1<D2) as a prescribed distance D short of the specific area.

When the specific area includes: a first lane leading to the specific area in which the number of lanes is increased or decreased; and a second lane adjacent to the first lane, the automated driving control part 120 determines a shift position which is a position a predetermined distance short of the specific area and at which the subject vehicle M shifts the driving status thereof from the second driving status to the first driving status. In this case, because the margin distance is changed for each of the lanes, the prescribed distance D is made larger during traveling in the first lane than during traveling in the second lane (D1<D2). The change in a level of automated driving for each lane makes it possible to maintain the highest possible automated driving status.

Operations of Vehicle Control Processing
Performed by Vehicle Controller 100 ("Change of
Re-Shift Start Distance")

Next is described an example in which a re-shift start distance of the second lane is made farther.

The automated driving control part 120 (see FIG. 2) determines whether or not a lane of interest is the first lane leading to a specific area in which the number of lanes is increased or decreased. If the lane of interest is determined to be the first lane leading to the specific area in which the number of lanes is increased or decreased, the automated driving control part 120 sets a re-shift allowance distance D11 which is a distance at which a re-shift is allowed after passing through the specific area. If the lane of interest is not determined to be the first lane leading to the specific area in which the number of lanes is increased or decreased, the automated driving control part 120 determines whether or not the lane of interest is the second lane adjacent to the first lane. If the lane of interest is the second lane adjacent to the first lane, the automated driving control part 120 sets a re-shift allowance distance D12 (D11<D12) which is a distance at which a re-shift is allowed after passing through the specific area.

The re-shift start distance at which a re-shift to the second driving status is allowed when the subject vehicle M passes through the specific area in the second lane is made larger than that in the first lane (D11<D12). Other vehicle is expected to shift from the first lane to the second lane after passing through the specific area. The longer re-shift distance during traveling in the second lane makes it possible to perform an automated driving with more stability.

As described above, the vehicle controller 100 according to this embodiment includes: the surrounding area recognition unit 142 configured to recognize a surrounding state of the subject vehicle M; the area specification unit 143 configured to specify a specific area in which the subject vehicle M travels; and the automated driving control part 120 configured to provide control on the subject vehicle M with respect to a vehicle traveling ahead thereof, based on a result recognized by the surrounding area recognition unit 142. The automated driving control part 120 makes the subject vehicle M operate at at least one of: the second driving status; and the third driving status which has an automated degree higher than that of the second driving status or has a driving task less than that of the second driving status. A condition of shifting from the second driving status to the third driving status is such that there is at least a vehicle traveling ahead of the subject vehicle M in the same lane recognized by the surrounding area recognition unit 142. When the subject vehicle M enters a specific area (an interchange, a junction, the number of lanes increased or decreased, or the like): and, if the subject vehicle M travels at the second driving status, the control state change unit 145 allows the subject vehicle M to keep the second driving status; and, if the subject vehicle M travels at the third driving status, the control state change unit 145 shifts the driving status to the second driving status.

The configuration described above makes it possible to control a shift of the driving status when a vehicle traveling ahead of the subject vehicle M changes lanes or is switched by another. Thus, the subject vehicle M can stably pass through a scene in which the number of lanes is increased or decreased.

In this embodiment, the area specification unit 143 acquires information on a specific area (an interchange, a junction, a decrease in the number of lanes, or the like) from map information. This makes it possible to detect the specific area even when visibility from the subject vehicle M to a distance is poor owing to a vehicle traveling ahead thereof.

In this embodiment, after the subject vehicle M passes through a specific area in which the number of through lanes is increased or decreased, if another specific area is not present within a predetermined distance, the automated driving control part 120 re-shifts the driving status of the subject vehicle M from the first driving status to the second driving status. This makes it possible to re-shift the driving status at a highest possible level, if another specific area is not present within the predetermined distance.

In this embodiment, when the subject vehicle M is passing through a specific area, if a lane in which the subject vehicle M is traveling leads to an area in which the number of lanes is increased or decreased, the automated driving control part 120 shifts the driving status from the third driving status to the second driving status. If a lane in which the subject vehicle M is not traveling leads to the specific area in which the number of lanes is increased or decreased, the automated driving control part 120 keeps the driving status at the third driving status. This makes it possible for the subject vehicle M to keep on traveling at a highest possible level, if a lane in which the subject vehicle M is traveling is not involved in a change in the number of lanes.

In this embodiment, if a lane in which the subject vehicle M is traveling leads to the specific area in which the number of lanes is increased or decreased, the driving control part 120 shifts the driving status of the subject vehicle from the second driving status to the first driving status. If the subject vehicle M has switched lanes from a lane to another which does not lead to a specific area in which the number of lanes is increased or decreased, the driving control part re-shifts the driving status of the subject vehicle from the second driving status to the third driving status. This makes it possible for the subject vehicle M to re-shift the driving status thereof to a higher level, when one vehicle traveling ahead thereof switches to another.

In this embodiment, if a specific area includes: a first lane leading to the specific area in which the number of lanes is increased or decreased; and a second lane which is adjacent to the first lane, the automated driving control part 120 determines a shift position which is situated at a predetermined distance short of the specific area, and at which the support status of the subject vehicle is shifted from the third driving status to the second driving status; and sets, when the subject vehicle is traveling in the first lane, the predetermined distance larger than that when the subject vehicle is traveling in the second lane. A change in a level of the automated driving for each lane makes it possible to maintain a highest possible level of the automated driving.

In this embodiment, when the subject vehicle M is passing through a specific area, the driving control part 120 sets a re-shift start distance when the subject vehicle M is traveling in the second lane, to a start distance larger than that when the subject vehicle is traveling in the first lane. The re-shift start distance is a start distance at which the subject vehicle is allowed to re-shift to the second support status. After passing through the specific area, other vehicle is expected to shift from the first lane to the second lane after passing through the specific area. The longer re-shift distance during traveling in the second lane makes it possible to perform an automated driving with more stability.

The above-described embodiments are intended to be illustrative of the present invention in an easily understandable manner and the present invention is not limited to that includes all of the components explained in the embodiments. A structure of an embodiment can be substituted by or added to that of another embodiment. Part of the structure of the embodiment can be substituted by or added to that of another embodiment. Part of the structure of the embodiment can be deleted.

The vehicle controller and the vehicle control method of the present invention can be realized by a program for causing a program to function as the vehicle controller and the vehicle control method. The program may be stored in a computer readable storage medium.

Part or all of a configuration, a function, a processing part, a processing unit, or the like described above can be realized by hardware by means of, for example, designing using an integrated circuit. The aforementioned configuration, function, or the like can be embodied by software in which a processor interprets and executes a program which realizes the function. Information such as a program, a table, a file, or the like for realizing such a function can be stored in a storage device including a memory, a hard disk, and a SSD (Solid State Drive) or in a storage medium including an IC (Integrated Circuit) card, a SD (Secure Digital) card, and an optical disc.

DESCRIPTION OF REFERENCE NUMERALS 20 finder
30 radar
40 camera
50 navigation device
55 communication device
60 vehicle sensor
70 HMI
100 vehicle controller
110 target lane determination part
120 automated driving control part (driving control part)
130 automated driving mode control unit
140 recognition unit
141 subject vehicle position recognition unit
142 surrounding area recognition unit (recognition unit)
143 area specification unit
144 traveling plan creation unit
145 control state change unit
146 notification control unit
147 locus generation unit
147A travel state determination unit
147B locus candidate generation unit
147C evaluation and selection unit
150 switching control unit
160 travel control part
170 HMI control unit
180 storage unit
200 travel drive force output device
210 steering device
220 brake device
M subject vehicle
DD detection device
D1, D2 predetermined distance short of specific area
D11, D12 re-shift start distance

The invention claimed is:

1. A vehicle controller, comprising a processor configured to:
recognize a surrounding state of a subject vehicle which travels in a lane on a road;
specify a specific area in the lane in which the subject vehicle travels;
provide control on the subject vehicle with respect to a vehicle traveling ahead thereof, based on the recognized surrounding state;
operate the subject vehicle in at least one of a first support status, and a second support status which has an automated degree higher than that of the first support status or has tasks required to be done by a vehicle occupant in the subject vehicle, less than the tasks required to be done by the vehicle occupant in the first support status;
determine a condition of shifting from the first support status to the second support status such that there is at least a vehicle traveling ahead of the subject vehicle in a same lane in which the subject vehicle is traveling,
when the subject vehicle enters the specific area,
  when the subject vehicle enters the specific area at the first support status, allow the subject vehicle to keep a support status thereof at the first support status, and,
  when the subject vehicle enters the specific area at the second support status, shift the support status from the second support status to the first support status,
wherein the specific area includes: a first lane which leads to the specific area in which a number of lanes is increased or decreased; and a second lane which is adjacent to the first lane,
wherein the processor is further configured to:
determine a shift position which is a position situated at a predetermined distance short of the specific area and at which the support status of the subject vehicle is shifted from the second support status to the first support status; and
set, when the subject vehicle is traveling in the first lane, the predetermined distance larger than that when the subject vehicle is traveling in the second lane.

2. The vehicle controller according to claim 1,
wherein the processor is further configured to acquire the specific area from map information.

3. The vehicle controller according to claim 2,
wherein, after the subject vehicle passes through the specific area, if another specific area is not present within a predetermined distance from the specific area, the processor is further configured to re-shift the first support status to the second support status.

4. The vehicle controller according to claim 3,
wherein, when the subject vehicle is passing through the specific area, if a lane in which the subject vehicle is traveling leads to the specific area in which the number of lanes is increased or decreased, the processor is further configured to shift from the second support status to the first support status, and, if the lane in which the subject vehicle is traveling does not lead to the specific area in which the number of lanes is increased or decreased, the processor is further configured to keep the second support status.

5. The vehicle controller according to claim 4, wherein, if the subject vehicle has switched lanes from one lane to another which does not lead to the specific area in which the number of lanes is increased or decreased, the processor is further configured to shift the first support status to the second support status.

6. The vehicle controller according to claim 2, wherein, when the subject vehicle is passing through the specific area, if a lane in which the subject vehicle is traveling leads to the specific area in which the number of lanes is increased or decreased, the processor is further configured to shift from the second support status to the first support status, and, if the lane in which the subject vehicle is traveling does not lead to the specific area in which the number of lanes is increased or decreased, the processor is further configured to keep the second support status.

7. The vehicle controller according to claim 6, wherein, if the subject vehicle has switched lanes from one lane to another which does not lead to the specific area in which the number of lanes is increased or decreased, the processor is further configured to re-shift the first support status to the second support status.

8. The vehicle controller according to claim 2, wherein the processor is further configured to set a re-shift start distance, when the subject vehicle is passing through the specific area and when the subject vehicle is traveling in the second lane, to a value larger than that when the subject vehicle is traveling in the first lane, the re-shift start distance being a start distance at which a to re-shift to the second support status is allowed.

9. The vehicle controller according to claim 1, wherein, after the subject vehicle passes through the specific area, if another specific area is not present within a predetermined distance from the specific area, the processor is further configured to re-shift the first support status to the second support status.

10. The vehicle controller according to claim 9, wherein, when the subject vehicle is passing through the specific area, if a lane in which the subject vehicle is traveling leads to the specific area in which the number of lanes is increased or decreased, the processor is further configured to shift from the second support status to the first support status, and, if the lane in which the subject vehicle is traveling does not lead to the specific area in which the number of lanes is increased or decreased, the processor is further configured to keep the second support status.

11. The vehicle controller according to claim 10, wherein, if the subject vehicle has switched lanes from one lane to another which does not lead to the specific area in which the number of lanes is increased or decreased, the processor is further configured to re-shift the first support status to the second support status.

12. The vehicle controller according to claim 9, wherein the processor is further configured to set a re-shift start distance, when the subject vehicle is passing through the specific area and when the subject vehicle is traveling in the second lane, to a value larger than that when the subject vehicle is traveling in the first lane, the re-shift start distance being a start distance at which a re-shift to the second support status is allowed.

13. The vehicle controller according to claim 1, wherein, when the subject vehicle is passing through the specific area, if a lane in which the subject vehicle is traveling leads to the specific area in which the number of lanes is increased or decreased, the processor is further configured to shift the second support status to the first support status, and, if the lane in which the subject vehicle is traveling does not lead to the specific area in which the number of lanes is increased or decreased, the processor is further configured to keep the second support status.

14. The vehicle controller according to claim 13, wherein, if the subject vehicle has switched lanes from one lane to another which does not lead to the specific area in which the number of lanes is increased or decreased, the processor is further configured to re-shift the first support status to the second support status.

15. The vehicle controller according to claim 1, wherein the processor is further configured to set a re-shift start distance, when the subject vehicle is passing through the specific area and when the subject vehicle is traveling in the second lane, to a value larger than that when the subject vehicle is traveling in the first lane, the re-shift start distance being a start distance at which a re-shift to the second support status is allowed.

16. A vehicle including the vehicle controller according to claim 1.

17. A vehicle control method in a vehicle controller, the vehicle controller including a processor recognizinq a surrounding state of a subject vehicle which travels in a lane on a road, specifying a specific area in the lane in which the subject vehicle travels, and providing control on the subject vehicle with respect to a vehicle traveling ahead thereof based on the recognized surrounding state, the vehicle control method comprising the steps of:

operating the subject vehicle, in at least one of a first support status, and a second support status which has an automated degree higher than that of the first support status or has tasks required to be done by a vehicle occupant less than that the tasks required to be done by the vehicle occupant in the first support status;

determining a condition of shifting from the first support status to the second support status such that there is at least a vehicle traveling ahead of the subject vehicle in a same lane in which the subject vehicle is traveling; and, when the subject vehicle enters the specific area,
when the subject vehicle enters the specific area at the first support status, allowing the subject vehicle to keep a support status thereof at the first support status, and,
when the subject vehicle enters the specific area at the second support status, shifting from the second support status to the first support status, wherein the specific area includes: a first lane which leads to the specific area in which the number of lanes is increased or decreased; and a second lane which is adjacent to the first lane, the vehicle control method further comprising the steps of:
determining a shift position which is a position situated at a predetermined distance short of the specific area and at which the support status of the subject vehicle is shifted from the second support status to the first support status; and
setting, when the subject vehicle is traveling in the first lane, the predetermined distance larger than that when the subject vehicle is traveling in the second lane.

* * * * *